US012666011B2

(12) United States Patent
Xu

(10) Patent No.: US 12,666,011 B2
(45) Date of Patent: Jun. 23, 2026

(54) MULTI-REFERENCE LINE INDEX LIST SORTING METHOD AND DEVICE, VIDEO CODING METHOD AND DEVICE, VIDEO DECODING METHOD AND DEVICE, AND SYSTEM

(71) Applicant: GUANGDONG OPPO MOBILE TELECOMMUNICATIONS CORP., LTD., Dongguan (CN)

(72) Inventor: Luhang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/002,489

(22) Filed: Dec. 26, 2024

(65) Prior Publication Data

US 2025/0126248 A1     Apr. 17, 2025

Related U.S. Application Data

(63) Continuation of application No. PCT/CN2022/103944, filed on Jul. 5, 2022.

(51) Int. Cl.
H04N 19/105     (2014.01)
H04N 19/159     (2014.01)
(Continued)

(52) U.S. Cl.
CPC ......... H04N 19/105 (2014.11); H04N 19/159 (2014.11); H04N 19/176 (2014.11); H04N 19/70 (2014.11)

(58) Field of Classification Search
CPC .................................................. H04N 19/105
(Continued)

(56) References Cited

U.S. PATENT DOCUMENTS 10,419,754 B1 *  9/2019  Zhao ...................... H04N 19/11
2019/0141318 A1 *  5/2019  Li ........................ H04N 19/159
(Continued)

FOREIGN PATENT DOCUMENTS

CN      111654696 A     9/2020
EP        4550777 A     5/2025
(Continued)

OTHER PUBLICATIONS

International Search Report and Written Opinion of the International Searching Authority regarding International Patent Application No. PCT/CN2022/103944, dated Nov. 16, 2022. Translation provided by WIPO Translate.
(Continued)

*Primary Examiner* — Leron Beck
(74) *Attorney, Agent, or Firm* — BAYES PLLC

(57)     ABSTRACT

A video decoding method, which includes: decoding intra prediction related syntax elements of a current block in a bitstream, and continuing to decode a multiple reference line index of the current block in a case where multiple reference line (MRL) is allowed to be used for the current block; in a case where it is determined that an MRL index list of the current block is allowed to be sorted according to a decoding result, sorting the MRL index list of the current block, to obtain a sorted MRL index list based on the current block; and determining the reference line selected for the current block according to the multiple reference line index and the sorted MRL index list based on the current block, and performing intra prediction on the current block according to the reference line selected for the current block.

18 Claims, 6 Drawing Sheets

(51) Int. Cl.
    *H04N 19/176*       (2014.01)
    *H04N 19/70*        (2014.01)

(58) Field of Classification Search
    USPC .............................................. 375/240.01–29
    See application file for complete search history.

(56)                 References Cited

U.S. PATENT DOCUMENTS

| | | | |
|---|---|---|---|
| 2019/0200011 A1* | 6/2019 | Yoo ...................... | H04N 19/176 |
| 2020/0007862 A1* | 1/2020 | Lin ........................ | H04N 19/70 |
| 2020/0014919 A1* | 1/2020 | Zhao .................... | H04N 19/593 |
| 2020/0177914 A1 | 6/2020 | Xu et al. | |
| 2020/0304780 A1* | 9/2020 | Li ........................ | H04N 19/176 |
| 2020/0359033 A1* | 11/2020 | Ramasubramonian ...................... | |
| | | | H04N 19/157 |
| 2020/0359050 A1* | 11/2020 | Van der Auwera .... | H04N 19/80 |
| 2020/0413050 A1* | 12/2020 | Wang ................... | H04N 19/593 |
| 2022/0038684 A1 | 2/2022 | Urban et al. | |
| 2022/0166968 A1 | 5/2022 | Choi et al. | |

FOREIGN PATENT DOCUMENTS

| | | |
|---|---|---|
| JP | 2025524349 A | 7/2025 |
| WO | 2020256506 A | 12/2020 |
| WO | 2024005480 A | 1/2024 |

OTHER PUBLICATIONS

Intra prediction using multiple reference lines for the versatile video coding standard; Yao-Jen Chang et al.; Applications of Digital Image Processing XLII, Sep. 6, 2019; Aug. 11, 2019-Aug. 15, 2019 SPIE; XP055714647.

Extended European search report issued by the EPO for Application No. EP22949745.8 dated Mar. 30, 2026.

Notice of Reasons for Refusal issued by the JPO for Japanese Patent Application No. 2024-576937, mailed on Jan. 23, 2026. English translation attached.

EE2-related: Modifications of the extended MRL candidate list; Joint Video Experts Team (JVET)of ITU-T SG 16 WP 3 and ISO/IEC JTC 1/SC 2925th Meeting, by teleconference, Jan. 12-21, 2022; JVET-Y0149-v1.

* cited by examiner

0: Planar
1: DC

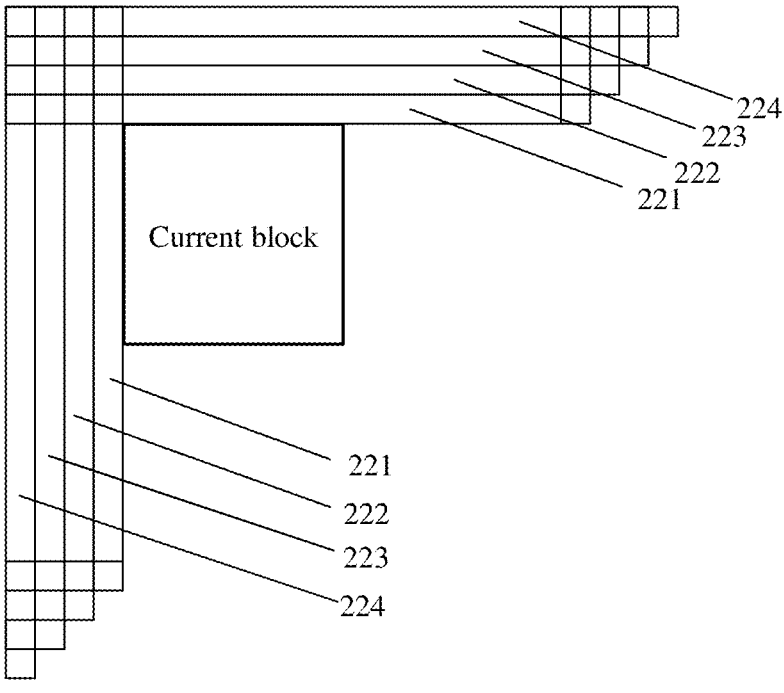

Current block 224
223
222
221

Prediction is performed on a template region according to at least portion of reference lines of a current block located outside the template region respectively, and differences between a reconstructed value of the template region and predicted values obtained from prediction are calculated

120

Indexes of reference lines corresponding to the differences are filled into an MRL index list of the current block according to an ascending order of the differences, to obtain a sorted MRL index list based on the current block

FIG. 6

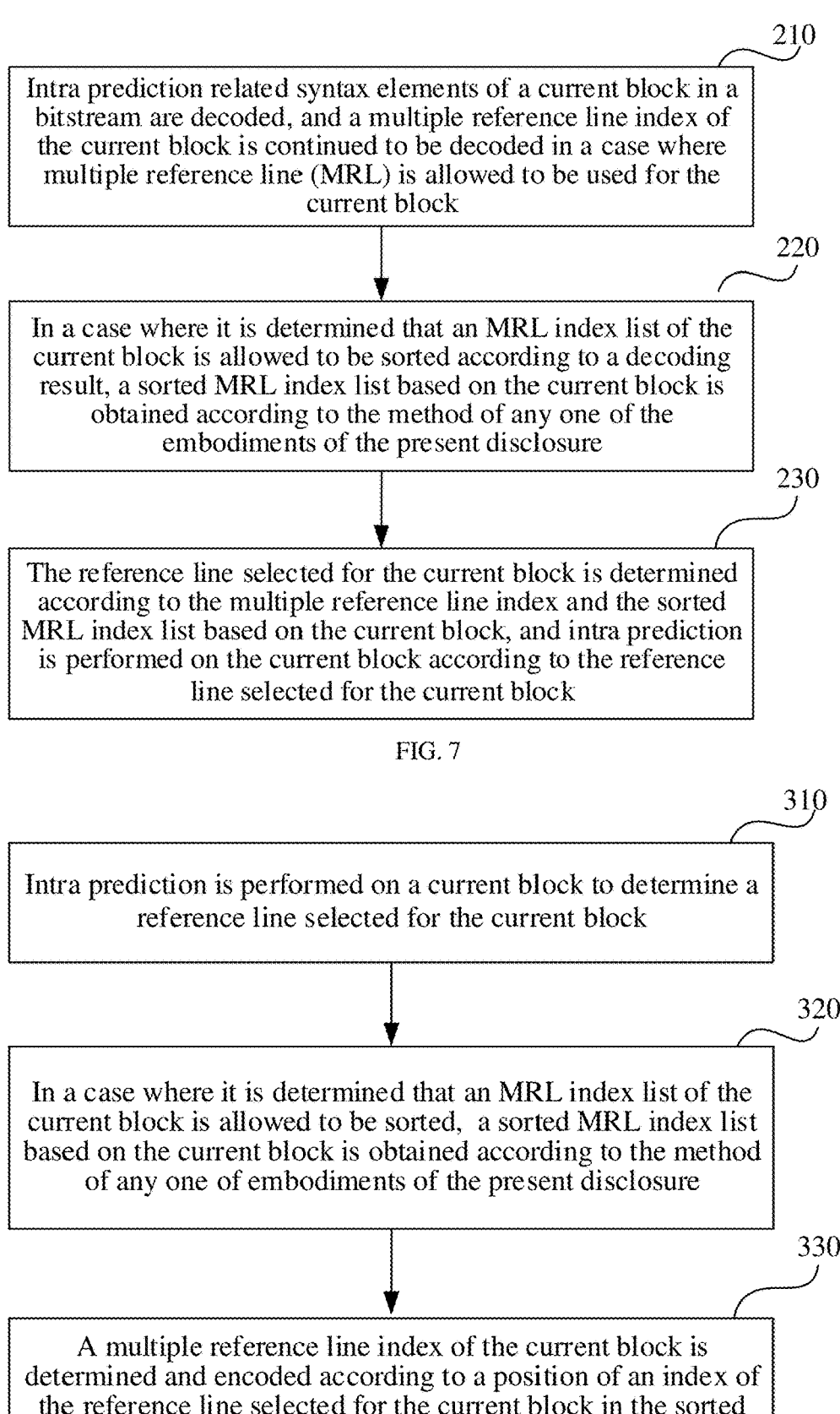

210

Intra prediction related syntax elements of a current block in a bitstream are decoded, and a multiple reference line index of the current block is continued to be decoded in a case where multiple reference line (MRL) is allowed to be used for the current block

220

In a case where it is determined that an MRL index list of the current block is allowed to be sorted according to a decoding result, a sorted MRL index list based on the current block is obtained according to the method of any one of the embodiments of the present disclosure

230

The reference line selected for the current block is determined according to the multiple reference line index and the sorted MRL index list based on the current block, and intra prediction is performed on the current block according to the reference line selected for the current block

Intra prediction is performed on a current block to determine a reference line selected for the current block

320

In a case where it is determined that an MRL index list of the current block is allowed to be sorted, a sorted MRL index list based on the current block is obtained according to the method of any one of embodiments of the present disclosure

330

A multiple reference line index of the current block is determined and encoded according to a position of an index of the reference line selected for the current block in the sorted MRL index list based on the current block

Current block

MULTI-REFERENCE LINE INDEX LIST SORTING METHOD AND DEVICE, VIDEO CODING METHOD AND DEVICE, VIDEO DECODING METHOD AND DEVICE, AND SYSTEM

CROSS-REFERENCE TO RELATED APPLICATION

This application is a Continuation application of International Application No. PCT/CN2022/103944 filed on Jul. 5, 2022, which is incorporated herein by reference in its entirety.

TECHNICAL FIELD

The embodiments of the present disclosure relate to, but are not limited to video technology, and more specifically, to a multi-reference line index list sorting method and device, a video encoding method and device, a video decoding method and device, and a system.

BACKGROUND

Digital video compression technology is mainly used to compress massive digital picture and video data for easy transmission and storage. The current common video coding standards, such as H.266/Versatile Video Coding (VVC), all adopt a block-based hybrid coding framework. Each frame in the video is partitioned into largest coding units (LCU) in a shape of square with the same size (such as 128×128, 64×64). Each largest coding unit may be partitioned into rectangular coding units (CUs) according to a rule. The coding units may further be classified as prediction units (PUs), transform units (TUs), etc. The hybrid coding framework includes modules, such as prediction, transform, quantization, entropy coding, in loop filter, etc. A prediction module includes inter prediction and intra prediction for reducing or removing inherent redundancy of a video. Prediction is performed on an intra block by using samples surrounding the block as references, while prediction is performed on an inter block by referring to information of spatially adjacent block and reference information in other frames. Compared with a prediction signal, residual information is transformed, quantized, or entropy coded into a bitstream in unit of block. These techniques are described in standards and implemented in various fields related to the video compression.

With the surge in Internet videos and increasing demand for video definition from people, although the existing digital video compression standards may save a lot of video data, there is still a need to pursue better digital video compression technology to reduce the bandwidth and traffic pressure of the digital video transmission.

SUMMARY

The following is a summary for the subject matters described in detail in the present description. This summary is not intended to limit the scope of the claims.

An embodiment of the present disclosure provides a multi-reference line index list sorting method, including:

performing prediction on a template region according to at least portion of reference lines of a current block located outside the template region respectively, to calculate differences between a reconstructed value of the template region and predicted values obtained from prediction; and filling indexes of reference lines corresponding to the differences into a multiple reference line (MRL) index list of the current block according to an ascending order of the differences, to obtain a sorted MRL index list based on the current block.

An embodiment of the present disclosure further provides a video decoding method, including:

decoding intra prediction related syntax elements of a current block in a bitstream, and continuing to decode a multiple reference line index of the current block in a case where multiple reference line (MRL) is allowed to be used for the current block, where the multiple reference line index is used to indicate a position of an index of a reference line selected for the current block in an MRL index list;

in a case where it is determined that an MRL index list of the current block is allowed to be sorted according to a decoding result, sorting the MRL index list of the current block according to the method of any one of the embodiments of the present disclosure, to obtain a sorted MRL index list based on the current block; and determining the reference line selected for the current block according to the multiple reference line index and the sorted MRL index list based on the current block, and performing intra prediction on the current block according to the reference line selected for the current block.

An embodiment of the present disclosure further provides a video encoding method, including:

performing intra prediction on a current block, to determine a reference line selected for the current block;

in a case where it is determined that an MRL index list of the current block is allowed to be sorted, sorting the MRL index list of the current block according to the method of any one of the embodiments of the present disclosure, to obtain a sorted MRL index list based on the current block; and determining and encoding a multiple reference line index of the current block according to a position of an index of the reference line selected for the current block in the sorted MRL index list based on the current block.

An embodiment of the present disclosure further provides a bitstream, where the bitstream includes a multiple reference line (MRL) index of a current block, and the multiple reference line index is used to indicate a position of an index of a reference line selected for the current block in an MRL index list, and the MRL index list is a sorted MRL index list based on the current block, or a set MRL index list.

An embodiment of the present disclosure further provides a multi-reference line index list sorting device, including a processor and a memory storing a computer program, where the processor may implement, upon executing the computer program, the multi-reference line index list sorting method of any one of the embodiments of the present disclosure.

An embodiment of the present disclosure further provides a video decoding device, including a processor and a memory storing a computer program, where the processor may implement, upon executing the computer program, the video decoding method of any one of the embodiments of the present disclosure.

An embodiment of the present disclosure further provides a video encoding device, including a processor and a memory storing a computer program, where the processor may implement, upon executing the computer program, the video encoding method of any one of the embodiments of the present disclosure.

An embodiment of the present disclosure further provides a video encoding and decoding system, including the video encoding device of any one of embodiments of the present disclosure, and the video decoding device of any one of embodiments of the present disclosure.

An embodiment of the present disclosure further provides a non-transitory computer-readable storage medium, where the computer-readable storage medium stores a computer program, where when the computer program is executed by a processor, the multi-reference line index list sorting method of any one of embodiments of the present disclosure, or the video decoding method of any one of embodiments of the present disclosure, or the video coding method of any one of embodiments of the present disclosure is implemented.

Other aspects may be understood upon reading and understanding the drawings and detailed description.

BRIEF DESCRIPTION OF THE DRAWINGS

The accompanying drawings are used to provide an understanding of the embodiments of the present disclosure, and constitute a part of the description, which is used to illustrate the technical solutions of the present disclosure together with the embodiments of the present disclosure, and do not constitute a limitation to the technical solutions of the present disclosure.

FIG. 5 is a schematic diagram of multiple reference lines around a current block in an embodiment of the present disclosure.

FIG. 6 is a flowchart of a multi-reference line index list sorting method in an embodiment of the present disclosure.

FIG. 7 is a flowchart of a video decoding method in an embodiment of the present disclosure.

FIG. 8 is a flowchart of a video encoding method according to an embodiment of the present disclosure.

DETAILED DESCRIPTION

Figure 1A:
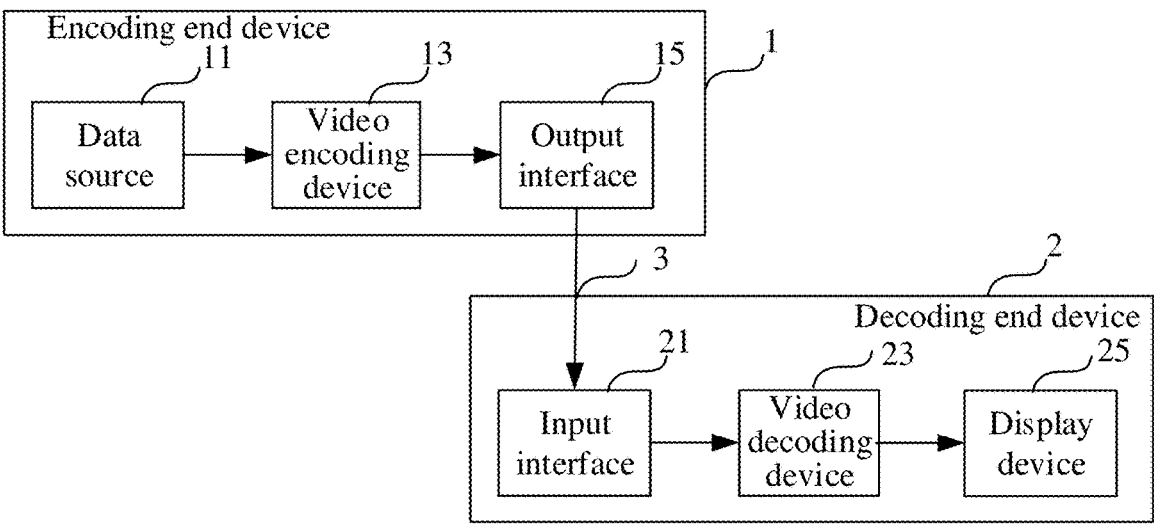
FIG. 1A is a schematic diagram of an encoding and decoding system in an embodiment of the present disclosure.

The present disclosure describes a plurality of embodiments, but the description is exemplary rather than restrictive, and it is obvious to those skilled in the art that there may be more embodiments and implementations within the scope of the embodiments described in the present disclosure.

In the description of the present disclosure, wordings, such as "exemplarily" or "for example" and variations thereof are used to indicate examples, instances, or illustrations. Any embodiment described in the present disclosure with wordings such as "exemplarily" or "for example" should not be illustrated as being more preferred or advantageous over other embodiments. The term "and/or" in the present disclosure is just a description for an association relationship between related objects, indicating that there are three relationships. For example, A and/or B may represent these three situations: A exists alone; A and B exist simultaneously; or B exists alone. Terms "multiple" or "a plurality of" and variations thereof mean a number of two or a number more than two. In addition, in order to describe the technical solutions of the embodiments of the present disclosure clearly, wordings such as "first" and "second" are adopted to distinguish same items or similar items with substantially same functions and effects. Those skilled in the art may understand that wordings such as "first", "second", etc., do not limit a quantity and an execution order, and the wordings such as "first", "second", etc., do not limit that corresponding objects must be different.

When describing representative exemplary embodiments, the description may have presented the method and/or process with a particular sequence of steps. However, to the extent that the method or process does not rely on a specific order of steps described herein, the method or process should not be limited to the specific order of steps as described. As those of ordinary skill in the art will understand, other orders of steps are also possible. Therefore, the specific order of the steps set forth in the description should not be construed as limitations on the claims. Furthermore, the claims for the method and/or process should not be limited to the described order to perform their steps, and those skilled in the art may readily understand that these orders may be varied, and still remain within the spirit and scope of the embodiments of the present disclosure.

A multi-reference line index list sorting method, a video encoding method, and a video decoding method proposed in the embodiments of the present disclosure may be applied to various video coding standards, such as: H.264/Advanced Video Coding (AVC), H.265/High Efficiency Video Coding (HEVC), H.266/Versatile Video Coding (VVC), Audio Video coding Standard (AVS), and other standards formulated by Moving Picture Experts Group (MPEG), Alliance for Open Media (AOM), Joint Video Experts Team (JVET) and extensions of these standards, or any other customized standards.

FIG. 1A is a block diagram of a video encoding and decoding system that may be used in an embodiment of the present disclosure. As shown in FIG. 1A, the system is divided into an encoding end device 1 and a decoding end device 2, and the encoding end device 1 generates a bitstream. The decoding end device 2 may decode the bitstream. The decoding end device 2 may receive the bitstream from the encoding end device 1 via a link 3. The link 3 includes one or more media or devices that may move the bitstream from the encoding end device 1 to the decoding end device 2. In an example, link 3 includes one or more communication media that enable the encoding end device 1 to send the bitstream directly to the decoding end device 2. The encoding end device 1 modulates the bitstream according to a communication standard (e.g., a wireless communication protocol), and sends the modulated bitstream to the decoding end device 2. The one or more communication media may include wireless and/or wired communication media, which may form a part of a packet network. In another example, the bitstream may be output from an output interface 15 to a storage device, and the decoding end device 2 may read stored data from the storage device via stream transmission or downloading.

As shown in FIG. 1A, the encoding end device 1 includes a data source 11, a video encoding device 13 and the output interface 15. The data source 11 includes a video capture device (e.g., a camera), an archive containing previously captured data, a feed interface for receiving data from a content provider, a computer graphics system for generating data, or a combination of these sources. The video encoding device 13 encodes data from the data source 11 and outputs the coded data to the output interface 15. The output interface 15 may include at least one of a regulator, a modem and a transmitter. The decoding end device 2 includes an input interface 21, a video decoding device 23 and a display device 25. The input interface 21 includes at least one of a receiver and a modem. The input interface 21 may receive the bitstream via the link 3 or from the storage device. The video decoding device 23 decodes the received bitstream. The display device 25 is configured to display decoded data. The display device 25 may be integrated with other devices of the decoding end device 2 or set separately, and the display device 25 is optionally for the decoding end. In other examples, the decoding end may include other devices or equipment that apply the decoded data.

Based on the video encoding and decoding system shown in FIG. 1A, various video encoding and decoding methods may be used to implement video compression and decompression.

Figure 1B:
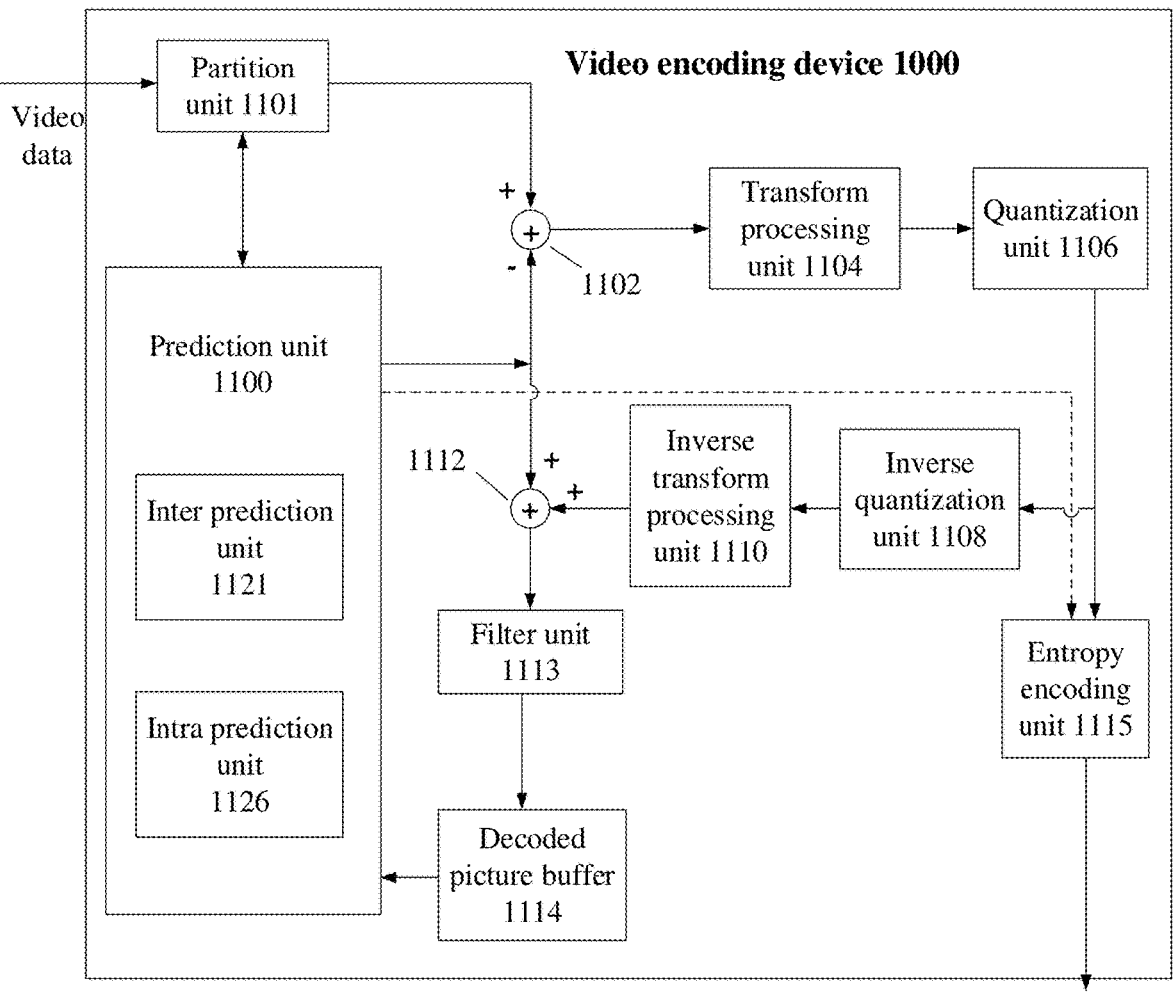
FIG. 1B is a framework diagram of an encoding end in an embodiment of the present disclosure.

FIG. 1B is a block diagram of an exemplary video encoding device that may be used in an embodiment of the present disclosure. As shown in FIG. 1B, the video encoding device 1000 includes a prediction unit 1100, a partition unit 1101, a residual generation unit 1102 (represented by a circle with a plus sign behind the partition unit 1101 in FIG. 1B), a transform processing unit 1104, a quantization unit 1106, an inverse quantization unit 1108, an inverse transform processing unit 1110, a reconstruction unit 1112 (represented by a circle with a plus sign behind the inverse transform processing unit 1110 in FIG. 1B), a filter unit 1113, a decode picture buffer 1114 and an entropy coding unit 1115. The prediction unit 1100 includes an inter prediction unit 1121 and an intra prediction unit 1126, and the decoded picture buffer 1114 may also be referred to as a buffer of decoded picture, a decoded image buffer, a buffer of decoded image, etc. The video encoding device 1000 may also include more, fewer, or different functional components than those in the example. For example, the transform processing unit 1104 and the inverse transform processing unit 1110, etc., may be eliminated in some situations.

The partition unit 1101 cooperates with the prediction unit 1100 to partition the received video data into slices, coding tree units (CTUs) or other larger units. The video data received by the partition unit 1101 may be a video sequence including video frames such as I frames, P frames or B frames.

The prediction unit 1100 may partition the CTU into coding units (CUs) and perform intra prediction encoding or inter prediction encoding on the CUs. When performing intra prediction and inter prediction on a CU, the CU may be partitioned into one or more prediction units (PUs).

The inter prediction unit 1121 may perform inter prediction on a PU to generate prediction data for the PU, where the prediction data includes a prediction block of the PU, motion information of the PU, and various syntax elements. The inter prediction unit 1121 may include a motion estimation (ME) unit and a motion compensation (MC) unit. The motion estimation unit may be used for motion estimation to generate a motion vector, and the motion compensation unit may be used to obtain or generate a prediction block according to the motion vector.

The intra prediction unit 1126 may perform intra prediction on the PU to generate prediction data for the PU. The prediction data for the PU may include a prediction block and various syntax elements of the PU.

The residual generation unit 1102 may generate a residual block of a CU by subtracting the prediction block of the PU that is partitioned from the CU based on an original block of the CU.

The transform processing unit 1104 may partition the CU into one or more transform units (TUs), and the partition with the prediction units and the partition with the transform units may be different. A residual block associated with a TU is a sub-block obtained by partitioning a residual block of a CU. A coefficient block associated with the TU is generated by applying one or more transforms to the residual block associated with the TU.

The quantization unit 1106 may quantize coefficients in a coefficient block based on selected quantization parameters. A quantization degree of the coefficient block may be adjusted by adjusting the quantization parameters (QP).

The inverse quantization unit 1108 and the inverse transform unit 1110 may apply inverse quantization and inverse transform to the coefficient block, respectively, to obtain a reconstructed residual block associated with the TU.

The reconstruction unit 1112 may add the reconstructed residual block and the prediction block generated by the prediction unit 1100 to generate a reconstructed picture.

The filter unit 1113 performs in loop filtering on the reconstructed picture and stores a filtered reconstructed picture in the decoded picture buffer 1114 as a reference picture. The intra prediction unit 1126 may extract a reference picture of a block neighboring the PU from the decoded picture buffer 1114 to perform intra prediction. The inter prediction unit 1121 may perform inter prediction on a PU of a current frame picture using a reference picture of a previous frame buffered by the decoded picture buffer 1114.

The entropy encoding unit 1115 may perform an entropy encoding operation on received data (e.g., syntax elements, quantized coefficient blocks, motion information).

Figure 1C:
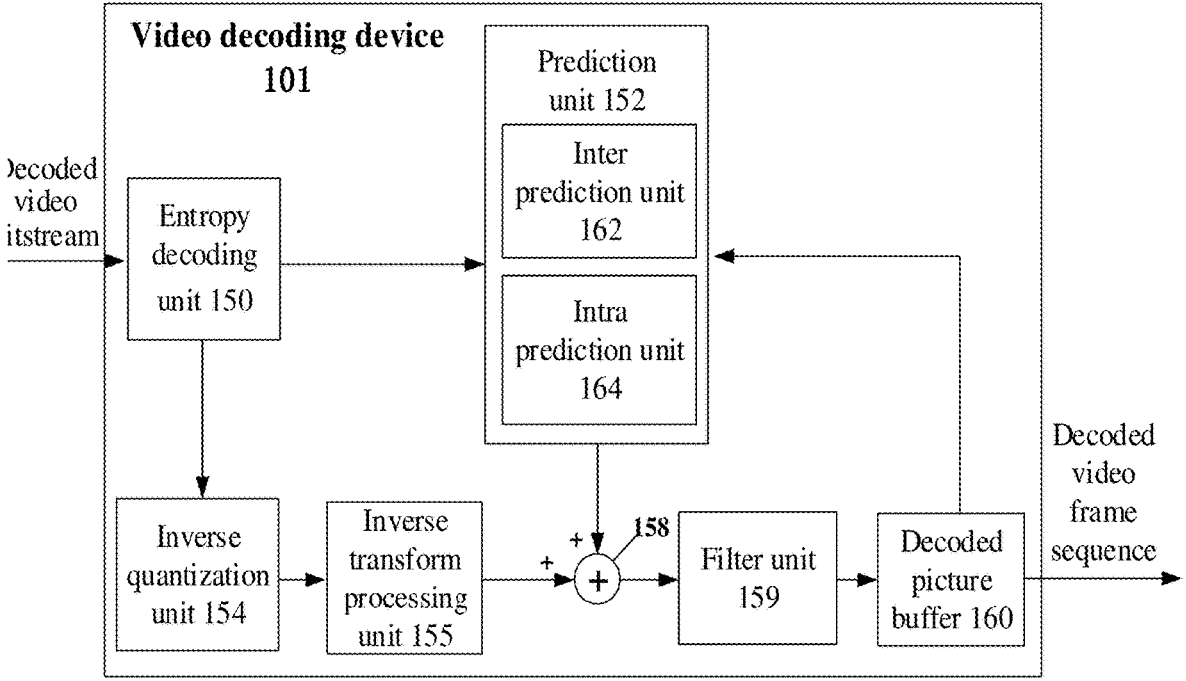
FIG. 1C is a framework diagram of a decoding end in an embodiment of the present disclosure.

FIG. 1C is a block diagram of an exemplary video decoding device that may be used in an embodiment of the present disclosure. As shown in FIG. 1C, the video decoding device 101 includes an entropy decoding unit 150, a prediction unit 152, an inverse quantization unit 154, an inverse transform processing unit 155, a reconstruction unit 158 (represented by a circle with a plus sign behind the inverse transform processing unit 155 in FIG. 1C), a filter unit 159, and a decoded picture buffer 160. In other embodiments, the video decoding device 101 may include more, fewer, or different functional components. For example, the inverse transform processing unit 155 may be eliminated in some situations.

The entropy decoding unit 150 may perform entropy decoding on received bitstream, to extract syntax elements, quantized coefficient blocks, motion information of a PU, etc. The prediction unit 152, the inverse quantization unit 154, the inverse transform processing unit 155, the reconstruction unit 158 and the filter unit 159 may all perform corresponding operations based on the syntax elements extracted from the bitstream.

The inverse quantization unit 154 may perform inverse quantization on a quantized coefficient block associated with the TU.

The inverse transform processing unit 155 may apply one or more inverse transforms to the inverse quantized coefficient block to generate a reconstructed residual block of the TU.

The prediction unit 152 includes an inter prediction unit 162 and an intra prediction unit 164. If a PU is encoded by using intra prediction, the intra prediction unit 164 may determine an intra prediction mode of the PU based on syntax elements decoded from the bitstream, perform intra prediction according to the determined intra prediction mode and reconstructed reference information neighboring the PU acquired from the decoded picture buffer 160, and generate a prediction block of the PU. If the PU is encoded by using inter prediction, inter prediction unit 162 may determine one or more reference blocks of the PU based on motion information of the PU and corresponding syntax elements, and generate a prediction block of the PU based on the reference blocks acquired from decoded picture buffer 160.

The reconstruction unit 158 may obtain a reconstructed picture based on the reconstructed residual block associated with the TU and the prediction block of the PU generated by the prediction unit 152.

The filter unit 159 may perform in loop filtering on the reconstructed picture, where the filtered reconstructed picture is stored in the decoded picture buffer 160. The decoded picture buffer 160 may provide a reference picture for subsequent motion compensation, intra prediction, inter prediction, etc., and may further output the filtered reconstructed picture as decoded video data for presentation on a display device.

Based on the above-mentioned video encoding device and video decoding device, the following basic encoding and decoding process may be performed. At the encoding end, a frame of picture is partitioned into blocks, intra prediction or inter prediction or other algorithms is performed on a current block to generate a prediction block of the current block, an original block of the current block is used to subtract the prediction block to obtain a residual block, the residual block is transformed and quantized to obtain a quantization coefficient, and the quantization coefficient is entropy encoded to generate a bitstream. At the decoding end, intra prediction or inter prediction is performed on the current block to generate a prediction block of the current block. On the other hand, the quantization coefficient obtained from the decoded bitstream is performed inverse quantization and inverse transform to obtain a residual block. The prediction block is added with the residual block to obtain a reconstructed block, and reconstructed blocks form a reconstructed picture. The reconstructed picture is performed in loop filtering based on a picture or based on blocks to obtain a decoded picture. The encoding end also obtains a decoded picture through operations similar to those operations on the decoding end. The decoded picture obtained by the encoding end is usually called as a reconstructed picture. The decoded picture may be used as a reference frame for inter prediction for subsequent frames. Block partition information, mode information such as prediction, transform, quantization, entropy coding, in loop filtering, etc., and parameter information determined by the encoding end may be written into the bitstream if necessary. The decoding end determines the same block partition information, mode information such as prediction, transform, quantization, entropy coding, in loop filtering, etc., and parameter information as the encoding end by decoding the bitstream or performing analysis according to existing information, thereby ensuring that the decoded picture obtained by the encoding end is the same as the decoded picture obtained by the decoding end.

Although a block-based hybrid encoding framework is taken as an example above, the embodiments of the present disclosure are not limited thereto. With the development of technology, one or more modules in the framework and one or more steps in the process may be replaced or optimized.

Herein, a current block may be a block-level encoding unit such as a current coding unit (CU) or a current prediction unit (PU) in a current picture.

Figure 2:
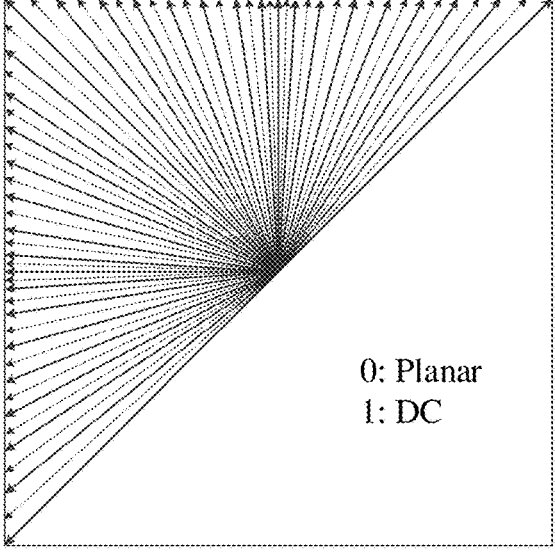
FIG. 2 is a schematic diagram of an intra prediction mode in an embodiment of the present disclosure.

When the encoding end performs intra prediction, various angular modes and non-angular modes are usually used to predict the current block, to obtain a prediction block; based on rate-distortion information obtained by calculating with the prediction block and an original block, an optimal prediction mode for the current block is screened out, and the prediction mode is encoded and transmitted to the decoding end via the bitstream. The decoding end obtains the prediction mode through decoding, and performs intra prediction on the current block according to the prediction mode. Through the development of successive digital video coding standards, non-angular modes have remained relatively stable, including an average mode (i.e., a direct current (DC) mode) and a planar mode (i.e., Planar mode); angular modes have continued to increase with the evolution of digital video coding standards. Taking the H series of international digital video coding standards as an example, the H.264/AVC standard has only 8 traditional angular prediction modes and 1 traditional non-angular prediction mode; H.265/HEVC has extended to 33 traditional angular prediction modes and 2 traditional non-angular prediction modes. In H.266/VVC, the traditional intra prediction modes include a Planar mode, a DC mode and 65 angular modes, as shown in FIG. 2. Herein, the DC mode is suitable for large flat regions, and a predicted value corresponding to the DC mode is obtained by calculating an average value of reference samples on the left side and/or the above side. The Planar mode is suitable for a situation where pixel gradients occur, that is, for regions where pixel values change slowly.

If the modes for the prediction block are encoded directly, 67 modes require 7 bits to perform encoding, which is a large amount of data. According to a statistical characteristic, the same intra prediction mode as that of the current block is more likely to be selected for a sample region closer to the current block. Based on this characteristic, the most probable mode (MPM) technology is adopted in HEVC, VVC and enhanced compression model (ECM). ECM is a reference software based on VTM-10.0 and integrates various new tools, to further explore the coding performance.

In the MPM technology, an MPM list is first built, and the MPM list is filled with intra prediction modes that are most likely to be selected for the current block. If a prediction mode selected for the current block is in the MPM list, only an index number of the prediction mode needs to be coded (only 3 bits are needed). If the prediction mode selected for the current block is not in the MPM, but in 61 non-MPM modes, the prediction mode is encoded by using a truncated binary code (TBC) in an entropy coding stage.

Figure 3:
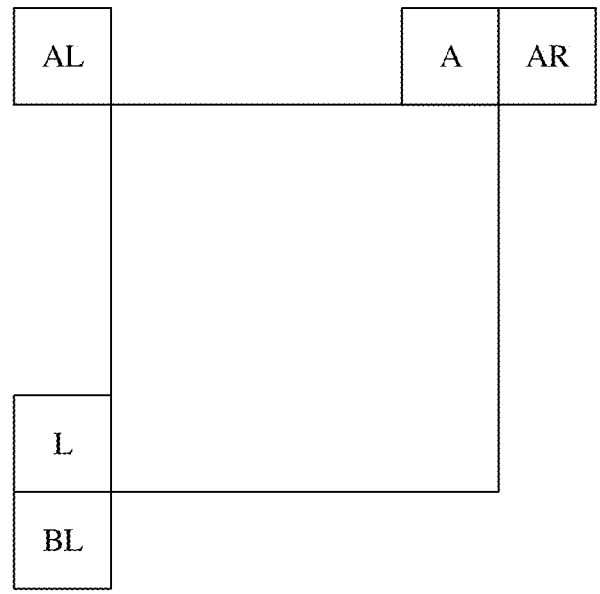
FIG. 3 is a schematic diagram of adjacent intra prediction blocks of a current block in an embodiment of the present disclosure.

In VVC, regardless of whether multiple reference line (MRL) and intra sub-partitions (ISP) are applied, the MPM list still has 6 prediction modes. The MPM in ECM is classified into an MPM and a secondary MPM. The MPM and the secondary MPM are lists with a length of 6 and a length of 16, respectively. Among the 6 modes in the MPM list, the Planar mode is always in a first place of the MPM list. The remaining 5 positions are filled in sequence by the following three steps until all 5 MPM positions are filled, and other remaining modes are filled into the seconding MPM automatically. In the first step, prediction modes used by five prediction blocks neighboring the current block, as shown in FIG. 3, include prediction modes used by prediction blocks at position of a above left (AL), a above (A), a above right (AR), an left (L) and a below left (BL) of the current block; in the second step, a mode derived from a gradient histogram is used for reconstructed samples surrounding the current block; in the third step, an angular mode similar to an angle of an angular mode selected in the first step is used. The secondary MPM list consists of some main angular modes other than the modes in the MPM.

Since an encoding order of an MPM flag bit is after the coding for the MRL mode, the coding for the MPM in the ECM depends on the MRL flag bit. The following table is an example:

| ... ... | Illustration |
| --- | --- |
| if(!mrl_flag){ | Not using MRL mode, i.e., not using extended reference lines? |
|   mpm_flag | If true, decoding an MPM usage flag |
| } | |
| else{ | Using extended reference lines |
|   mpm_flag = 1 | Then an initial MPM usage flag is 1, i.e., default to use |
| } | |
| if(mpm_flag){ | |
|   mpm_idx = 0 | |
|   if(multiRefIdx == 0){ | |
|     mpm_idx = decodeBin( ) | Decoding a binary symbol based on a context model |
|   } | |
|   else{ | |
|     mpm_idx = 1 | |
|   } | |
|   if(mpm_idx > 0){ | |
|     mpm_idx += decodeBin( ) | Decoding a binary symbol based on a context model |
|     if(mpm_idx > 1) | |
|       mpm_idx += decodeEPBin( ) | Decoding a binary symbol of equiprobability |
|       if(mpm_idx > 2) | |
|         mpm_idx += decodeEPBin( ) | Decoding a binary symbol of equiprobability |
|         if(mpm_idx > 3) | |
|           mpm_idx += decodeEPBin( ) | Decoding a binary symbol of equiprobability |
|   } | |
| } | |
| ... ... | Decoding a portion not being MPM |

Figure 4:
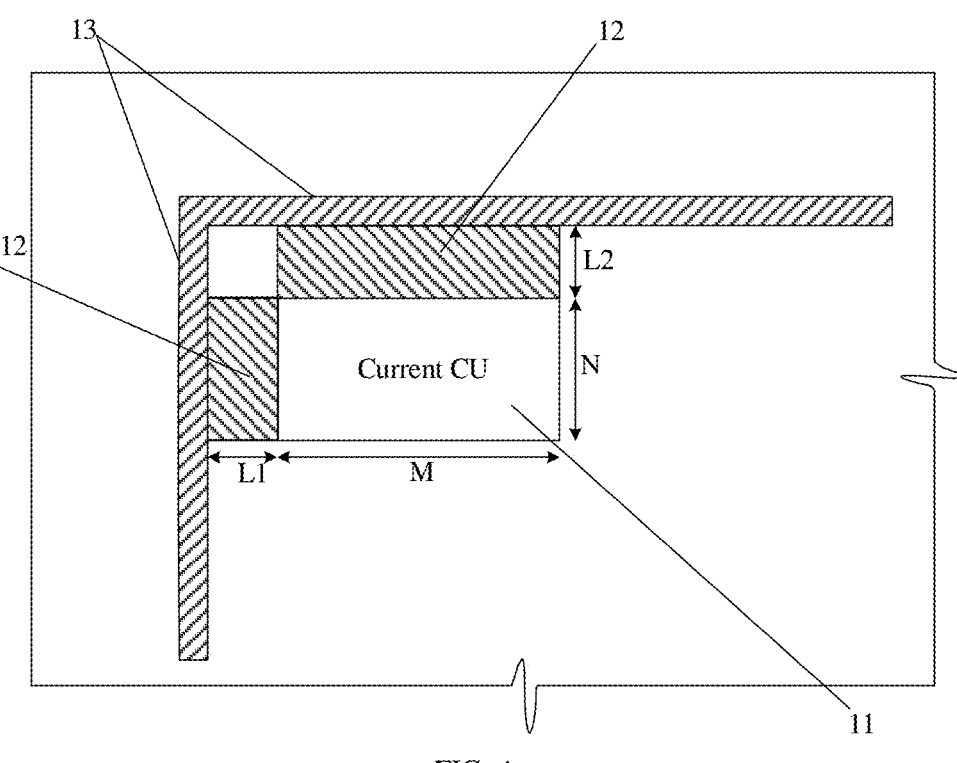
FIG. 4 is a schematic diagram of a template region of a current block and a reference of the template region in an embodiment of the present disclosure.

Template-based intra mode derivation (TIMD) is an intra prediction mode for a luma frame. The TIMD mode is generated according to a candidate mode in the MPM list and a template. In ECM, as shown in FIG. 4, a neighboring region on a left side and a neighboring region on an above side of a current block (shown as Current CU) 11 constitute a template region 12 of the current block, and a reference of the template region 13 is provided on the outside (i.e., the left side and the above side) of the template region 12, and exemplary sizes and positions of each region are shown in FIG. 4. The reference of the template region 13 may be a line adjacent to the template region on the above side or a column adjacent to the template region on the left side.

In the TIMD, assuming that distribution characteristics of the current block and the template region of the current block are consistent, taking a reconstructed value of the reference of the template region as a reference line, all modes in MPM and secondary MPM are traversed to perform prediction on the template region, to obtain a prediction result. Then, a sum of absolute transformed differences (SATD) between a reconstructed value of the template region and a prediction result of each mode is calculated, and a mode with a minimum SATD (i.e., an optimal mode) is selected, and this mode is used as the TIMD mode of the current block. The decoding end may derive the TIMD mode in the same derived way. If the TIMD is allowed to be used for a sequence, each current block requires a flag bit to indicate whether the TIMD is used. If an intra prediction mode selected for the current block is the TIMD mode, prediction is performed on the current block by using the TIMD mode, and a decoding process for remaining luma frames and intra prediction related syntax elements (such as ISP and MPM) may be skipped, thereby significantly reducing the coding bits of the mode.

After obtaining a SATD between the reconstructed value of the template region and the prediction result of each mode, a finally used TIMD mode may be determined according to the following manner:

assuming that mode1 and mode2 are two angular modes for intra prediction in MPM, mode1 is an angular mode with a minimum SATD, and a SATD of the mode1 is cost1; mode2 is an angular mode with a second minimum SATD, and a SATD of the mode2 is cost2;

when cost1×2≤cost2, mode1 is used as the TIMD mode of the current block;

when cost1×2>cost2, a prediction mode obtained by weighting prediction results of mode1 and mode2 is used as the TMID mode of the current block, which is also referred to as a TIMD fusion mode.

A weighting manner and weights are shown in the following formulas:

$$Pred = Pred_{mode1} \times w1 + Pred_{mode2} \times w2$$

$$w1 = \frac{cost2}{cost1 + cost2}, w2 = \frac{cost1}{cost1 + cost2}$$

where Pred is a prediction result of the current block obtained by using the TIMD fusion mode, $Pred_{mode1}$ is a prediction result of the current block obtained by using mode1, $Pred_{mode2}$ is a prediction result of the current block obtained by using mode2, and w1 and w2 are weights obtained from calculation according to cost1 and cost2.

In the HEVC, intra prediction is performed by using an upper line and a left column closest to the current block as reference for prediction. If there is a relatively large difference between a reconstructed value of this line and column and an original sample value, the prediction quality of the current block may also be greatly affected. To solve this problem, in the VVC, the MRL intra prediction technology is adopted. In addition to using a closet line of reference samples (i.e., reference line 0 (Reference line0)), in the VVC, reference line 1 (Reference line1) and reference line 2 (Reference line2) are further used as extended reference lines for performing intra prediction. To reduce the encoding complexity, MRL is only used in non-planar modes in MPM. When the encoding end performs prediction on each angular mode, all three reference lines are needed to be tried and then a reference line with a minimum rate-distortion cost (RD Cost) is selected. An index of the selected reference line is the same as an index of a selected intra prediction mode, which is also encoded and sent to the decoding end. The decoding end obtains the index of the reference line by decoding, and then selects a corresponding reference line for prediction according to the index of the reference line.

FIG. 5 shows an example of four reference lines, which includes a reference line0 221 adjacent to the current block, i.e., a reference line with an index of 0; a reference line1 222 with an interval of 1 line from the current block, i.e., a reference line with an index of 1; a reference line2 223 with an interval of 2 lines from the current block, i.e., a reference line with an index of 2; and a reference line3 224 with an interval of 3 lines from the current block, i.e., a reference line with an index of 3. Upon predicting, only reconstructed values of a part of reference lines may be used. In an example, a region within the reference line0 is used as a template region of the current block, and the reference line0 may be referred to as a reference line where the template region is located, and reference line1 to reference line3 may be referred to as reference lines located outside the template region.

In this description, indexes of the reference lines are all numbered in the manner shown in FIG. 5. Except for a reference line with an index of 0, the other reference lines are extended reference lines.

In this description, although a reference line is referred to as a line, but this is convenient for description, actually one reference line includes one line and one column. A reconstructed value of the reference line used in prediction also includes a reconstructed value of one line and a reconstructed value of one column, which is the same as a description manner usually used in the art.

In ECM, decoding manners related to a multiple reference line index are shown in Table 1 and Table 2 below. Herein, Table 1 is used to show cases where TIMD is not used for the current block, and Table 2 is used to show cases where TIMD is used for the current block.

TABLE 1

| ... ... | |
|---|---|
| if( !sps_mrl_flag | If a sequence-level flag is not allowed to use mrl |
| \|\| cu.timd | Or timd is selected to be used for a current coding unit |
| \|\| cu.dimd | Or dimd is selected to be used for a current coding unit |
| \|\| isFirstLineOfCtu | Or a current coding unit is located in a first line of a coding tree unit |
| \|\| cu.bdpcmMode | Or bdpcm is selected to be used for a current coding unit |
| \|\| !cu.Y( ).valid){ | Or a current coding unit does not include a luma component |
| multiRefIdx = 0 | Then, not using mrl |
| } | |
| else{ | Else (Using mrl): |
| idx += decodeBin( ) | Decoding a binary symbol based on a context model (i.e., a binary flag) |
| if(idx > 0) | |
| idx += decodeBin( ) | Decoding a binary symbol based on a context model |
| if(idx > 1) | |
| idx += decodeBin( ) | Decoding a binary symbol based on a context model |
| if(idx > 2) | |
| idx += decodeBin( ) | Decoding a binary symbol based on a context model |
| if(idx > 3) | |
| idx += decodeBin( ) | Decoding a binary symbol based on a context model |

TABLE 1-continued

| if(idx > 4) | |
|---|---|
| idx += decodeBin( ) | Decoding a binary symbol based on a context model |
| multiRefIdx = MULTI_REF_LINE_IDX[idx] | Acquiring multiRefIdx |
| } | |

In the ECM, an MRL tool may use more reference lines. In order to encode a reference line selected for the current block (i.e., a reference line selected for the current block), indexes of multiple candidate reference lines are filled into a list. In this description, this list is referred to as a multiple reference line index list, abbreviated as an MRL index list, but it may also be referred to as a multiple reference line list, a candidate reference line list, a reference line index list, etc. In a case where TIMD is not used for the current block, a length of the multiple reference line index list is 6, that is, there are 6 positions in total that may be filled with indexes of 6 reference lines. The indexes of these 6 reference lines and an order of these indexes are fixed, which is represented as MULTI_REF_LINE_IDX[6]={0, 1, 3, 5, 7, 12}. In this multiple reference line index list, an index filled in a first position is 0, which is an index of a reference line closest to the current block. Indexes filled in a second position to a sixth position are 1, 3, 5, 7, and 12, respectively, which are indexes of five extended reference lines with an ascending order of distances from the current block to a reference line.

Upon encoding the reference line selected for the current block, due to the existence of the multiple reference line index list, the index of the reference line is not encoded directly. Instead, an index (which is referred to as a multiple reference line index (multiRefIdx)) of a position of the index of the reference line in the multiple reference line index list is encoded. The multiple reference line index is used to indicate a position of the index of the reference line selected for the current block in the multiple reference line index list. Taking an MRL index list {0, 1, 3, 5, 7, 12} as an example, indexes from the 1st position to the 6th position are 0 to 5, respectively. If an index of a reference line selected for the current block is 7, and an index 7 is at a 5th position in the multiple reference line index list, then a multiple reference line index is 4.

The multiple reference line index (multiRefIdx) may be encoded by using a unary truncation code based on a context model, etc., which is not limited thereto. The smaller the value of a multiple reference line index, the shorter the code length, and the faster the decoding.

The MRL mode may also be used simultaneously with the TIMD mode. In a case where the TIMD is used, a length of the MRL index list is 3, which may be filled with indexes of 3 reference lines, and an order of these indexes is fixed, which is represented as MULTI_REF_LINE_IDX[3]={0, 1, 3}, where 0 is an index of a reference line of a template region, and 1 and 3 are indexes of extended reference lines.

A coding manner of a multiple reference line index is shown in Table 2:

TABLE 2

| ... ... | |
|---|---|
| if( (!sps_mrl_flag | If a sequence-level flag is not allowed to use mrl |
| \|\| cu.dimd | Or dimd is selected to be used for a current coding unit |
| \|\| isFirstLineOfCtu | |
| \|\| cu.bdpcmMode | a current coding unit |
| \|\| !cu.Y( ).valid)){ | Or a current coding unit is located in a first line of a coding tree unit |

TABLE 2-continued

| | |
|---|---|
| | Or bdpcm is selected to be used for a current coding unit |
| | Or a current coding unit does not include a luma component |
| multiRefIdx = 0 | Then, not using mrl under a timd mode |
| } | |
| else if(cu.timd){ | If timd is selected for a current coding unit |
| idx += decodeBin( ) | Decoding a binary symbol based on a context model |
| if(idx > 0) | |
| idx += decodeBin( ) | Decoding a binary symbol based on a context model |
| multiRefIdx = MULTI_REF_LINE_IDX[idx] | Acquiring multiRefIdx |
| } | |

For ease of understanding, in the above description, cases of using the TIMD and not using the TIMD are illustrated with two tables, respectively, the above two tables may also be combined into one table.

In different standards, the technology of deriving a list of most probable modes (MPM) using blocks around the current block may have different names, for example, in AV2 (AVM), this technology is referred to as adaptive intra mode coding (AIMC), and in AVS3, in the case of screen content coding, this technology is referred to as frequency-based intra mode coding (FIMC). In the case of non-screen content coding, this technology, which is similar to MPM, is always turned on. The multiple reference line technology (MRL) that uses multiple reference lines for intra prediction is referred to as multiple reference line selection for intra prediction (MRLS) in AV2 (AVM). There is merely a difference in name, when the MPM or MRL are used in the embodiment, these essentially identical technologies in other standards may be covered.

Compared with the VVC, in the ECM, a number of reference line candidates of MRL is extended, but a 0.09% encoding performance improvement in intra frame encoding is brought out. After research, this is due to an increase in a number of MRL candidate index lines, which requires more flag bits for encoding the MRL mode, and brought additional burden is also increased. It could be seen from the MRL decoding manners shown in Table 1 and Table 2 above that the multiple reference line index list is composed of indexes in a specified fixed order. The closer the index of the selected reference line is to the front of the table, the lower the cost of encoding the multiple reference line index.

A multi-reference line index list sorting method is provided in an embodiment of the present disclosure, and the method may be used at an encoding end, and may also be used at a decoding end. As shown in FIG. 6, the method includes the following steps.

In step 110, prediction is performed on a template region according to at least portion of reference lines of a current block located outside the template region respectively, and differences between a reconstructed value of the template region and predicted values obtained from prediction are calculated.

The above-mentioned differences may be represented by a sum of absolute differences (SAD), or represented by a sum of absolute transformed differences (SATD), which is not limited thereto, and may also be represented by a sum of squared differences (SSD), a mean absolute difference (MAD), a mean square error (MSE), etc.

In step 120, indexes of reference lines corresponding to the differences are filled into an MRL index list of the current block according to an ascending order of the differences, to obtain a sorted MRL index list based on the current block.

In the previous embodiments, the MRL index list is set by the encoding and decoding system, and indexes of the reference lines filled into the MRL index list and an order of these indexes for filling into the MRL index list are fixed. In the embodiments of the present disclosure, a template-based manner is used to predict the template region respectively according to the at least portion of the reference lines of the current block located outside the template region, and the differences between the reconstructed value of the template region and the predicted values obtained by prediction are calculated, and the indexes of the reference lines corresponding to the differences are filled into the MRL index list of the current block in the ascending order of the differences, to obtain the sorted MRL index list based on the current block. Therefore, according to the embodiments of the present disclosure, a block-level MRL index list is constructed, where the indexes of the reference lines and the order of the reference lines are determined based on distribution characteristics of the template region of the current block. Thus, the reference line selected for the current block is more likely to appear in the MRL index list, and is also more likely to appear at a front position in the MRL index list. That is, a value of a multiple reference line index that needs to be encoded is more likely to be a relatively small value, which makes a code length short, and occupies less bandwidth, and also speeds up the decoding speed, thereby improving the encoding performance.

In an exemplary embodiment of the present disclosure, performing prediction on the template region according to the at least portion of reference lines of the current block located outside the template region respectively includes: performing, for each reference line in the at least portion of the reference lines, prediction on the template region by using a reconstructed value of the reference line and an intra prediction mode selected for the current block. When the method of this embodiment is used at the encoding end, after a selection for intra prediction mode is completed and an intra-frame prediction mode (herein referring to a traditional intra prediction mode such as an average mode, a planar mode or an angular mode) is selected for the current block, the template region is performed prediction based on the intra prediction mode selected for the current block in combination with each of reference lines involved in the sorting. When the method of this embodiment is used at the decoding end, after intra prediction related syntax elements of the current block are decoded and the intra prediction mode selected for the current block is determined, the above prediction may be performed to obtain the sorted MRL index list based on the current block. Then, the reference line selected for the current block may be determined according to the multiple reference line index obtained by decoding.

In an exemplary embodiment of the present disclosure, filling the indexes of the reference lines corresponding to the differences into the MRL index list of the current block is: filling the indexes of the reference lines corresponding to the differences position by position starting from a $K_1$-th position of the MRL index list until a $K_2$-th position is filled at most, where $2 \leq K_1 \leq K_2 \leq M$, and M is a length of the MRL index list. An index actually filled into the MRL index list may be less than or equal to M.

In the MRL index list of the current block, an index of a reference line where the template region is located may be filled in the MRL index list, such as a reference line 221 shown in FIG. 5, and an index of the reference line is 0;

indexes of reference lines located outside the template region may also be filled in the MRL index list, such as reference lines 222, 223 and 224 shown in FIG. 5, and indexes of these three reference lines are 1, 2, and 3, respectively. When sorting the MRL index list of the current block, the reference line where the template region is located is not used for prediction. Therefore, an index of the reference line where the template region is located does not involve in sorting, and these reference lines are more likely to be selected. In this embodiment, indexes of the reference lines that do not involve in sorting are directly filled in one or more positions at the front of the MRL index list. And starting from the $K_1$-th position, indexes of reference lines that are involved in sorting is filled position by position. A value of $K_1$ may be 2 or 3, but is not limited thereto.

In an exemplary embodiment of the present disclosure, the method further includes: in the sorted MRL index list based on the current block, filling, from a 1st position to a $(K_1-1)$-th position that are not involved in sorting, indexes of reference lines where the template region of the current block is located $(K_1-1)$-th position that are not involved in sorting, where an index of a reference line filled in the 1st position is 0. In this embodiment, when the template region is limited within a line and a column closest to the current block, only one index 0 of one reference line closest to the current block needs to be filled in. But in other embodiments, the template region may also be extended, such as extending to a second line at an above side of the current block and a second column at a left side of the current block, or the template region may be extended to a larger region, that is, the template region is set on multiple reference lines closest to the current block. At this time, more indexes of reference lines may be filled into the MRL index list. However, not all indexes of reference lines overlapping the template region need to be filled into the MRL index list, but a portion of reference lines overlapping the template region may be selected to be filled into the MRL index list.

In an exemplary embodiment of the present disclosure, filling the indexes of the reference lines corresponding to the differences into the MRL index list of the current block is: filling the indexes of the reference lines corresponding to the differences position by position starting from a 1st position of the MRL index list until a $K_2$-th position is filled at most, where $1 \le K_2 \le M$, and M is a length of the MRL index list. Different from the aforementioned embodiments, in this embodiment, the index of the reference line where the template region of the current block is located is not needed to be filled into the MRL index list. For example, assuming that there is only one line of the reference line(s) where the template region is located, the index of the reference line selected for the current block is 0, that is, when the extended reference lines are not used, the index of the selected reference line does not need to be represented by a multiple reference line index, and may be represented by setting an MRL usage flag to false. Therefore, the MRL index list does not need to be filled with an index 0, and indexes of reference lines that are involved in sorting may be filled in from a 1st position of the MRL index list in an ascending order of differences.

In an exemplary embodiment of the present disclosure, in a case where $K_2 < M$, starting from a $(K_2+1)$-th position to an M-th position of the MRL index list, indexes of $(M-K_2)$ reference lines are filled position by position in an ascending order of distances from the current block to a reference line, where the $(M-K_2)$ reference lines are located outside the template region, and specified by a system, and indexes of the $(M-K_2)$ reference lines are different from indexes that have been filled in the MRL index list.

In this embodiment, in one or more positions at back of the MRL index list, the indexes of the reference lines corresponding to the differences is no longer filled in the ascending order of differences, but specified reference lines located outside the template region is filled in. For example, a length M of the MRL index list is 6, and the indexes of the reference lines sorted by differences are only filled into a second position and a third position in the MRL index list. In an example, a set MRL index list is {0, 1, 3, 5, 7, 12}, where 1, 3, 5, 7, 12 are indexes of the specified reference lines. In this embodiment, prediction is performed according to reference lines with indexes of 1 to 12. It is assumed that the two lines with a minimum difference are reference lines with indexes of 5 and 7, since these two reference lines were originally specified reference lines, thus a sorted MRL index list based on the current block is {0, 5, 7, 1, 3, 12}, that is, the indexes of 1, 3, 12 of the specified reference lines in the set MRL index list are filled into positions at back of the sorted MRL index list. If the two lines with the minimum difference are the reference lines with indexes 4 and 6, since these two lines are not specified reference lines, thus the sorted MRL index list is {0, 4, 6, 1, 3, 5}, that is, the indexes of the specified reference lines are filled position by position in the ascending order of distances from the current block to a reference line.

In an exemplary embodiment of the present disclosure, the template region of the current block is set on a reference line closest to the current block, that is, on a reference line with an index of 0; or the template region of the current block is set on multiple reference lines closest to the current block, such as being set on two reference lines with indexes of 0 and 1, or being set on three reference lines with indexes of 0, 1, and 2, or being set on four reference lines with indexes of 0, 1, 2, and 3, etc.

In an exemplary embodiment of the present disclosure, the at least portion of the reference lines of the current block located outside the template region includes:

1) $N'$ reference lines closest to the current block and outside the template region; or
2) odd-numbered lines among the $N'$ reference lines closest to the current block and outside the template region; or
3) even-numbered lines among the $N'$ reference lines closest to the current block and outside the template region; or
4) N reference lines selected by comparing differences between neighbor lines from the $N'$ reference lines closest to the current block and outside the template region, $N \le N'$; or
5) N reference lines specified from the $N'$ reference lines closest to the current block and outside the template region;

where $N' \le N_{max}$, $N_{max}$ is a maximum number of reference lines that are allowed to involve in sorting.

When sorting, a number of reference lines involved in sorting and which reference lines needs to be selected are needed to be determined first. A plurality of selection manners are given in the embodiment.

In this embodiment, it is assumed that a $N_{max}$ set in a case where TIMD is used for the current block and a $N_{max}$ set in a case where TIMD is not used for the current block are both 12, the template region is located in the reference line closest to the current block, that is, located in the reference line with an index of 0, and the reference line of the current block is not allowed to exceed an upper boundary of the CTU, then the above-mentioned first manner is: selecting the N' reference lines closest to the current block and outside the template region to involve in sorting; if the number of reference lines within a range from outside of the template region to the upper boundary of the CTU is greater than or equal to 12, then N'=12, that is, 12 reference lines closest to the current block and outside the template region are selected to involve in sorting. If there are not 12 reference lines, N' is equal to a number of reference lines within a range from the outside of the template region to the upper boundary of the CTU. A second manner and a third manner respectively are: selecting odd-numbered lines or even-numbered line respectively from the reference lines determined in the first manner, to simplify the calculation.

In an example of the present embodiment, a fourth manner of the embodiment is: selecting N reference lines from the N' reference lines outside the template region and closest to the current block by comparing the differences between neighbor lines, which may be implemented in the following manner: designating a reference line outside the template region and closest to the current block as a first selected reference line, and comparing the first selected reference line with neighbor reference lines of the first selected reference line one by one, and designating a neighbor reference line closest to the first selected reference line and whose difference between the neighbor reference line and the first selected reference line is greater than a set threshold as a newly selected reference line, and so on until the N' reference lines have been compared and selected. Herein, the difference refers to a difference between reconstructed values of two reference lines (two reference lines involved in comparing), or refers to a difference between predicted values obtained by respectively performing prediction on the template region with reference to the reconstructed values of the two reference lines.

A process of comparing is illustrated with an example below, and for ease of description, the reference lines outside the template region are numbered in an ascending order of distances from the current block to a reference line. A reference line closest to the current block is referred to as a first reference line outside the template region, which is abbreviated as a first reference line; a reference line second closest to the current block is referred to as a second reference line outside the template region, which is abbreviated as a second reference line, and so on. Assuming that a number of reference lines within a range from the template region to the upper boundary of the CTU is greater than 12.

The process of comparing is as follows: after selecting the first reference line outside the template region, comparing a difference between the first reference line and an adjacent line of the first reference line, i.e., the second reference line, if the difference is less than a set threshold, continuing to compare the difference between the first reference line and a third reference line; if the difference is greater than the set threshold, selecting the third reference line as a newly selected line; then comparing a difference between the third reference line and an adjacent line of the third reference line (i.e., a fourth reference line), and if the difference is greater than the set threshold, using the fourth reference line as the newly selected line; and then comparing a difference between the fourth reference line and an adjacent line of the fourth reference line (i.e., a fifth reference line), and so on, until a twelfth reference line is compared; if a difference between the twelfth reference line and a most recently selected reference line is greater than the set threshold, selecting the twelfth reference line to involve sorting; otherwise, not selecting the twelfth reference line.

It may be seen that when the above four manners are adopted, the MRL index list sorting method of the embodiments of the present disclosure is not limited to the sorting itself, but the reference lines involving in sorting may be selected, and reference lines whose indexes are filled into the MRL index list are further selected, which helps to find an optimal reference line and improve the efficiency of video encoding.

However, in the present disclosure, a specified reference line may also be used for sorting. In the fifth manner described above, the reference lines involved in sorting are N reference lines specified from the N' reference lines closest to the current block and outside the template region, for example, specified reference lines with indexes of 1, 3, 5, 7, and 12. At this time, it is equivalent to sorting the reference lines in the set MRL index list, and no new reference line is introduced.

In an example of this embodiment, the N' reference lines closest to the current block and outside the template region are reference lines that do not exceed the upper boundary of the coding tree unit (CTU) where the current block is located.

In an example of this embodiment, a $N_{max}$ set in a case where a template-based intra mode derivation (TIMD) is used for the current block and a $N_{max}$ set in a case where TIMD is not used for the current block are both greater than or equal to 3. In an example, the $N_{max}$ set in a case where TIMD is used for the current block is 12, and the $N_{max}$ set in a case where TIMD is not used for the current block may also be 12. A specific value of $N_{max}$ is not limited in the present disclosure, for example, a value of $N_{max}$ may be 5, 6, 7, 8, 9, 10, 11, 12, 13, 14, 15, or a value greater than 15, such as 18, 24, 36, etc.

A video decoding method is further provided in the present disclosure, as shown in FIG. 7, the method includes the following steps.

In step 210, intra prediction related syntax elements of a current block in a bitstream are decoded, and a multiple reference line index of the current block is continued to be decoded in a case where multiple reference line (MRL) is allowed to be used for the current block.

As mentioned above, the multiple reference line index is used to indicate a position of an index of a reference line selected for the current block in an MRL index list.

In step 220, in a case where it is determined that an MRL index list of the current block is allowed to be sorted according to a decoding result, the MRL index list of the current block is sorted according to the method of any one of the embodiments of the present disclosure, to obtain a sorted MRL index list based on the current block.

In step 230, the reference line selected for the current block is determined according to the multiple reference line index and the sorted MRL index list based on the current block, and intra prediction is performed on the current block according to the reference line selected for the current block.

In this embodiment, during a decoding process, in a case where it is determined that the MRL index list of the current block is allowed to be sorted, the MRL index list of the current block is first sorted according to the method of the above-mentioned embodiments of the present disclosure to obtain the sorted MRL index list based on the current block; then based on the multiple reference line index obtained by decoding and the sorted MRL index list based on the current block, the reference line selected for the current block is determined, and then intra prediction is performed on the current block based on the reference line selected for the current block. In this embodiment, the MRL index list sorted based on the current block may be used to decode the multiple reference line index, so that the reference line selected for the current block is more likely to be located at the front position of the MRL index list, thereby saving coding overhead and improving encoding performance.

In an exemplary embodiment of the present disclosure, when decoding the intra prediction related syntax elements of the current block in the bitstream, the intra prediction mode selected for the current block is decoded for sorting the MRL index list of the current block; when intra prediction is performed on the current block according to the reference line selected for the current block, intra prediction is performed on the current block according to the reference line selected for the current block and the intra prediction mode selected for the current block.

In an exemplary embodiment of the present disclosure, the method further includes: in a case where it is determined that the MRL index list of the current block is not allowed to be sorted according to the decoding result, determining the reference line selected for the current block according to the multiple reference line index and a set MRL index list, and performing intra prediction on the current block according to the reference line selected for the current block. In this embodiment, when it is determined that the MRL index list of the current block is not allowed to be sorted, the set MRL index list is used to determine a reference line pointed to by the multiple reference line index.

In an example of this embodiment, in a case where it is determined that TIMD is not used for the current block, the set MRL index list is {0, 1, 3, 5, 7, 12}; when it is determined that TIMD is used for the current block, the set MRL index list is {0, 1, 3} or {0, 1, 2}.

Whether the MRL index list of the current block is allowed to be sorted may be determined according to decoding of the multiple reference line index, or may be directly indicated by a flag.

In an exemplary embodiment of the present disclosure, the method further includes: in a case where it is determined that the MRL index list of the current block is allowed to be sorted, setting a flag of the current block indicating that the MRL index list is allowed to be sorted as true.

In another exemplary embodiment of the present disclosure, any one or more of the following conditions is designated as a sufficient condition for not allowing the MRL index list of the current block to be sorted:

the multiple reference line (MRL) being not used for the current block;

the multiple reference line index indicating a position in the MRL index list that does not involve in sorting, such as a 1st position;

the current frame being not a luma frame;

the current block being located at an upper boundary of a coding tree unit (CTU);

an intra prediction mode selected for the current block being a specified mode, where the specified mode includes any one or more of the following modes: a planar mode, a TIMD fusion mode with a mode of planar mode, an average mode, a horizontal angular mode, a vertical angular mode, and a wide angular mode;

a size of the current block not meeting a set condition;

an aspect ratio of the current block not meeting a set condition.

In a case where conditions (which are not limited to conditions listed above) for not allowing the MRL index list of the current block to be sorted are all not met, it is determined that the MRL index list of the current block is allowed to be sorted.

In an example, one of the conditions of TIMD being used for the current block and TIMD being not used for the current block may be used as a sufficient condition for not allowing the MRL index list of the current block to be sorted. That is, at this time, the MRL index list is allowed to be sorted only when TIMD is used for the current block or TIMD is not used for the current block.

In an exemplary embodiment of the present disclosure, in a case where MRL is used for the current block, the method further includes: decoding syntax elements of a portion of transform modes that is capable of being used with the MRL simultaneously for the current block, and skipping syntax elements of a portion of transform modes that is not capable of being used with the MRL simultaneously.

In this embodiment, some transform modes may be skipped in a case where MRL is used for the current block. The MRL mode is at a relatively back position among all intra prediction modes. For example, it is necessary to determine whether a current mode is MRL only after it is determined that the current mode is not Decoder-side Intra Mode Derivation (DIMD), block-based delta pulse code modulation (BDPCM), matrix-based intra prediction (MIP), or TIMD. In VVC, a primary transform and a quadratic transform may be used for a residual signal, to make a transformed residual easier to be encoded. Herein, a primary transform includes DCT2 transform and DST7. However, the quadratic transform is to further transform the residual that has been performed the primary transform in a case where the primary transform is performed with using of DCT2. In ECM, a mode of the primary transform is further extended. Taking into account that the selection of different modes requires additional bits to represent, which may bring out overhead of codewords, and traversing these transform modes at the encoding end may further increase the encoding time, so when the multiple reference line mode is selected for intra prediction, it is possible to limit that only the DCT2 mode is used in the primary transform and the secondary transform may further be used, or only the primary transform may be used, or only the DCT2 transform may be used. In this way, when encoding an index of a corresponding transform mode, the encoding of the transform mode may be skipped according to whether the MRL mode has been selected.

In an exemplary embodiment of the present disclosure, when MRL is used for the current block, the method further includes: in a process of decoding an intra prediction mode selected for the current block, allowing to decode syntax elements related to a second MPM. In this embodiment, the MRL and the second MPM mode are allowed to be used simultaneously.

In an exemplary embodiment of the present disclosure, decoding the multiple reference line index of the current block includes: decoding the multiple reference line index of the current block according to different MRL index lists in a case where TIMD is used for the current block and in a case where TIMD is not used for the current block.

A video encoding method is further provided in the present disclosure, as shown in FIG. 8, the method includes the following steps.

In step 310, intra prediction is performed on a current block to determine a reference line selected for the current block.

In step 320, in a case where it is determined that an MRL index list of the current block is allowed to be sorted, the MRL index list of the current block is sorted according to the method of any one of the embodiments of the present disclosure, to obtain a sorted MRL index list based on the current block.

In step 330, a multiple reference line index of the current block is determined and encoded according to a position of an index of the reference line selected for the current block in the sorted MRL index list based on the current block.

In this embodiment, during an encoding process, when it is determined that the MRL index list of the current block is allowed to be sorted, the MRL index list of the current block is first sorted according to the method of the above-mentioned embodiments of the present disclosure to obtain the sorted MRL index list based on the current block; then according to the position of the index of the reference line selected for the current block in the sorted MRL index list based on the current block, the multiple reference line index of the current block is determined and encoded. In this embodiment, the MRL index list sorted based on the current block may be used to encode the multiple reference line index, so that the reference line selected for the current block is more likely to be located at the front position of the MRL index list, thereby saving coding overhead of the multiple reference line index and improving the encoding performance.

In an exemplary embodiment of the present disclosure, before sorting the MRL index list of the current block, the method further includes: determining an intra prediction mode selected for the current block.

In an exemplary embodiment of the present disclosure, the method further includes: in a case where it is determined that the MRL index list of the current block is not allowed to be sorted, determining and encoding the multiple reference line index of the current block according to the position of the index of the reference line selected for the current block in a set MRL index list. In this embodiment, in a case where it is determined that the MRL index list of the current block is not allowed to be sorted, the position of the selected reference line in the set MRL index list is used to determine the multiple reference line index of the current block.

In an exemplary embodiment of the present disclosure, the method further includes: in a case where it is determined that the MRL index list of the current block is allowed to be sorted, setting a flag of the current block indicating that the MRL index list is allowed to be sorted as true. In this embodiment, a flag is directly used to indicate whether the MRL index list of the current block is allowed to be sorted.

In an exemplary embodiment of the present disclosure, any one or more of the following conditions is designated as a sufficient condition for not allowing the MRL index list of the current block to be sorted:

MRL being not used for the current block;

the reference line selected for the current block being located in a template region of the current block;

the current frame being not a luma frame;

the current block being located at an upper boundary of a coding tree unit (CTU);

an intra prediction mode selected for the current block being a specified mode, where the specified mode includes any one or more of the following modes: a planar mode, a TIMD fusion mode with a mode of planar mode, an average mode, a horizontal angular mode, a vertical angular mode, and a wide angular mode;

a size of the current block not meeting a set condition;

an aspect ratio of the current block not meeting a set condition;

one of TIMD being used for the current block or TIMD being not used for the current block.

In a case where conditions (which are not limited to conditions listed above) for not allowing the MRL index list of the current block to be sorted are all not met, it is determined that the MRL index list of the current block is allowed to be sorted.

In an exemplary embodiment of the present disclosure, different MRL index lists are used in a case where TIMD is used for the current block and in a case where TIMD is not used for the current block.

Determining and encoding the multiple reference line index of the current block includes:

in a case where TIMD is used for the current block, determining and encoding the multiple reference line index of the current block according to a position of the index of the reference line selected for the current block in a first MRL index list; and in a case where TIMD is not used for the current block, determining and encoding the multiple reference line index of the current block according to a position of the index of the reference line selected for the current block in a second MRL index list;

where a length of the second MRL index list is greater than or equal to a length of the first MRL index list.

In an exemplary embodiment of the present disclosure, in a case where MRL is used for the current block, the method further includes: encoding syntax elements of a portion of transform modes that is capable of being used with the MRL simultaneously for the current block, and skipping coding for a portion of transform modes that is not capable of being used with the MRL simultaneously.

In an exemplary embodiment of the present disclosure, in a case where MRL is used for the current block and a mode selected for the current block is not a TIMD mode, the method further includes: after encoding the multiple reference line index, continuing to encode an intra prediction mode selected for the current block, and in a process of encoding the intra prediction mode selected for the current block, allowing to encode syntax elements related to a second MPM.

A bitstream is further provided in an embodiment of the present disclosure, where the bitstream includes a multiple reference line index of a current block, and the multiple reference line index is used to indicate a position of an index of a reference line selected for the current block in an MRL index list, and the MRL index list is a sorted MRL index list based on the current block, or a set MRL index list. The bitstream of this embodiment may be generated according to the video encoding method of any one of the embodiments of the present disclosure.

Figure 9:
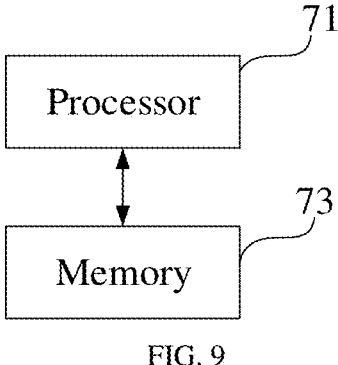
FIG. 9 is a schematic diagram of a multi-reference line index list sorting device in an embodiment of the present disclosure.

A multi-reference line index list sorting device is further provided in an embodiment of the present disclosure, as shown in FIG. 9, the device includes a processor 71 and a memory 73 storing a computer program, where the processor 71 may implement, upon executing the computer program, the multi-reference line index list sorting method of any one of the embodiments of the present disclosure.

A video decoding device is further provided in an embodiment of the present disclosure, as shown in FIG. 9, the device includes a processor and a memory storing a computer program, where the processor may implement, upon executing the computer program, the video decoding method of any one of the embodiments of the present disclosure.

A video encoding device is further provided in an embodiment of the present disclosure, as shown in FIG. 9, the device includes a processor and a memory storing a computer program, where the processor may implement, upon executing the computer program, the video coding method of any one of the embodiments of the present disclosure.

The processor of the above-mentioned embodiments of the present disclosure may be a general-purpose processor, which includes a central processing unit (CPU), a network processor (NP), a microprocessor, etc., or may be other conventional processors, etc. The processor may also be a digital signal processor (DSP), an application specific integrated circuit (ASIC), a field programmable gate array (FPGA), a discrete logic component or other programmable logic components, a discrete gate or a transistor logic component, a discrete hardware assembly, or a combination thereof. That is, the processor in the above-mentioned embodiments may be any processing component or component combination that implements various methods, steps and logic block diagrams disclosed in the embodiments of the present disclosure. If the embodiments of the present disclosure are partially implemented in software, instructions for the software may be stored in a suitable non-transitory computer-readable storage medium, and one or more processors may be used to execute the instructions in hardware to implement the methods of the embodiments of the present disclosure.

A video encoding and decoding system is further provided in an embodiment of the present disclosure, which includes the video encoding device of any one of embodiments of the present disclosure, and the video decoding device of any one of embodiments of the present disclosure.

A non-transitory computer-readable storage medium is further provided in an embodiment of the present disclosure, where the computer-readable storage medium stores a computer program, where when the computer program is executed by a processor, the multi-reference line index list sorting method of any one of embodiments of the present disclosure, or the video decoding method of any one of embodiments of the present disclosure, or the video encoding method of any one of embodiments of the present disclosure is implemented.

A video decoding method is further provided in an embodiment of the present disclosure, which sorts a multiple reference line index list of a current block during a decoding process. In this embodiment, sorting based on a template region is an operation that both the encoding end and the decoding end need to perform, which works on representing the position of the selected reference line in the MRL index list through the multiple reference line index from the MRL index list, and the sorted MRL index list based on the current block is combined with the position to jointly determine the reference line selected for the current block, and then the determined reference line and the selected intra prediction mode (a traditional prediction mode) are used for prediction.

Figure 10:
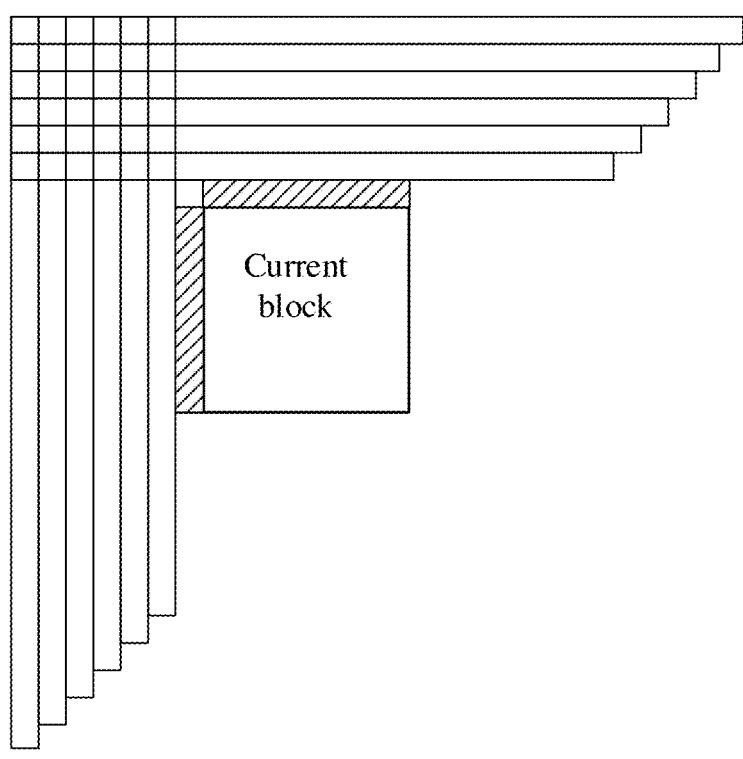
FIG. 10 is a schematic diagram of a template and multiple reference lines around a current block in an embodiment of the present disclosure.

In this embodiment, a specific example is used to illustrate how to use a sum of absolute differences (SAD) between a predicted value (pred) and a reconstructed value (reco) of the template region to sort an MRL index list. (x, −1), (−1, y) are coordinates relative to an above left corner (0, 0) of the current block. In this embodiment, a template region with 1 row and 1 column of the current block may refer to a region with section lines shown in FIG. 10. Six reference lines located outside the template region of the current block are shown in FIG. 10.

The method of this embodiment includes the following steps.

A First Step

The decoder parses the intra prediction mode, confirms when the decoder parses the MRL-related syntax elements, uses or does not use MRL on the current block, and decodes the multiple reference line indexes of the current block.

A syntax table related to this embodiment is shown in the following table:

| | Descriptor |
|---|---|
| coding_unit( x0, y0, cbWidth, cbHeight, cqtDepth, treeType, modeType ) { | |
|   … … | |
|     if( pred_mode_plt_flag ) | |
|       palette_coding( x0, y0, cbWidth, cbHeight, treeType ) | |
|     else { | |
|       if( sps_bdpcm_enabled_flag && cbWidth <= MaxTsSize && cbHeight <= MaxTsSize ) | |
|         intra_bdpcm_luma_flag | ae(v) |
|       if( intra_bdpcm_luma_flag ) | |
|         intra_bdpcm_luma_dir_flag | ae(v) |
|       else { | |
|         if( sps_mip_enabled_flag ) | |
|           intra_mip_flag | ae(v) |
|         if( intra_mip_flag ) { | |
|           intra_mip_transposed_flag[ x0 ][ y0 ] | ae(v) |
|           intra_mip_mode[ x0 ][ y0 ] | ae(v) |
|         } else { | |
|           if( sps_timd_enable_flag && cbWidth * cbHeight <= 1024 ) | |
|             intra_timd_flag | ae(v) |
|           if( sps_mrl_enabled_flag && ( ( y0 % CtbSizeY ) > 0 ) && !intra_timd_flag ) | |
|             intra_luma_mrl_tab_idx | ae(v) |
|           if( sps_mrl_enabled_flag && ( ( y0 % CtbSizeY ) > 0 ) && intra_timd_flag ) | |
|             intra_timd_luma_ref_idx | ae(v) |
|           if( sps_isp_enabled_flag && intra_luma_ref_idx = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag && !cu_tmrl_flag) | |
|             intra_subpartitions_mode_flag | ae(v) |
|           if( intra_subpartitions_mode_flag = = 1 ) | |
|             intra_subpartitions_split_flag | ae(v) |
|           if( !intra_timd_mode ){ | |
|          if( intra_luma_ref_idx = = 0 ) | |
|           intra_luma_mpm_flag[ x0 ][ y0 ] | ae(v) |
|          if( intra_luma_mpm_flag[ x0 ][ y0 ] ) { | |
|           if( intra_luma_ref_idx = = 0 ) | |
|            intra_luma_not_planar_flag[ x0 ][ y0 ] | ae(v) |
|           if( intra_luma_not_planar_flag[ x0 ][ y0 ] ) | |
|            intra_luma_mpm_idx[ x0 ][ y0 ] | ae(v) |
|          } else | |
|           intra_luma_mpm_remainder[ x0 ][ y0 ] | ae(v) |
|         } | |
|         } | |
|       } | |
|       } | |
|     } | |
|   … … | |

In the table, a field of intra_luma_mrl_tab_idx defines a multiple reference line index in a case where TIMD is not used for the current block (i.e., a field of !Intra_timd_flag), to indicate a position of an index of a reference line index selected for the current block in the sorted MRL index list. A value of the field of intra_luma_mrl_tab_idx is in a range of 0 to 5. A field of intra_timd_luma_ref_idx defines a multiple reference line index in a case where TIMD is used for the current block, to indicate a position of an index of a reference line index selected for the current block in a set MRL index list. A value of the field of intra_timd_luma_ref_idx is in a range of 0 to 2. In both cases, the multiple reference line index may be encoded or decoded by adopting the truncated unary based on the context mode1.

In this example, the set MRL index list is not sorted in a case where TIMD is not used for the current block. However, in other examples, an order of the MRL index list of the current block may also be generated in a case where TIMD is used for the current block. When the MRL index list is sorted in a case where TIMD is used for the current block, only the reference lines whose indexes are filled in the set MRL index list are sorted, or more reference lines may be introduced, for example, the same reference lines as the reference lines sorted in a case where TIMD is not used for the current block are involved in sorting. At this time, a syntax element similar to the field of intra_luma_mrl_tab_idx may be used instead the field of intra_timd_luma_ref_idx.

In the description, a wording "timd" in tables is the same concept as a wording "TIMD", and other concepts are similar thereto.

A Second Step

After a decoding stage is finished, and before prediction for the current block is performed, if a multiple reference line index of the current block is not 0, that is, an index of a selected reference line is not 0, the set MRL index list is not used, but the MRL index list of the current block needs to be sorted. The sorting is performed only for extended reference lines (reference lines whose index is not 0 in this embodiment).

A sorting process is as follows.

First, how many extended reference lines are allowed at most for a position where the current block is located in the picture are determined. In principle, upper reference lines that do not exceed an upper boundary of CTU may be used for the current block. In ECM, a maximum size of the CTU may be 256×256. When an ordinate y of a position of an above left corner of the current block in the picture is used to take a remainder with 256, an obtained remainder is a number of upper reference lines within the CTU boundary with respect to the current block. At the same time, if 13 reference lines (reference lines 0~12) may be used for MTL in non TIMD mode, the reference lines that may be involved in sorting are reference lines 1~N, i.e., the reference lines with indexes of 1~N, where N=min (12, (x % 256)−1)). In other embodiments, if it is supported by hardware, the used reference lines may also exceed the boundary of the CTU.

The N reference lines, i.e., reference lines 1 to N, are located outside the template region of a line where a reference line 0 is located. For each of the N reference lines, prediction is performed on the template region by using the selected intra prediction mode. Since the template region of the reference line 0 has been reconstructed, the SAD may be calculated based on the reconstructed value and the predicted value. A number of N SAD values may be sorted in an ascending order, and indexes of M reference lines with minimum calculated SADs are filled into the MRL index list.

Specifically, a length of an MRL index list is 6 in a case where TIMD is not used for the current block and a length of an MRL index list is 3 in a case where TIMD is used. Filling values set for these two lists are {0, 1, 3, 5, 7, 12} and {0, 1, 3}, which represents reference lines with indexes 0, 1, 3, 5, 7, 12 and reference lines with indexes 0, 1, 3, respectively. The sorting in this embodiment is sorting the reference lines 1~N, so an index 0 filled in a first position in the MRL index list remains unchanged, and only the sorted extended reference lines will be filled in subsequent positions. In a case where TIMD is not used for the current block, at most 5 indexes may be filled in; in a case where TIMD is used for the current block, at most 2 indexes may be filled in.

During the sorting process, it should be considered that in some cases, two adjacent reference lines to be sorted may have similar reconstructed values. In this case, predicted results using these two lines are approximate, and one of the two lines may be skipped to remove redundancy. There may be two ways of skipping.

Method 1: Calculating a SAD value between the reconstructed values at the corresponding positions of two adjacent reference lines. When the SAD value is less than a preset threshold, it is considered that a similarity between the two reference lines is too large, and one of the two reference lines should be skipped. If an adjacent reference line is skipped, the selected reference line is continuously compared with a next closest reference line with a threshold.

Method 2: Using two reference lines to predict the template region respectively, and calculating SAD values between prediction results on the template region, and when a SAD value is less than a preset threshold, it is considered that the similarity between the two lines is too large and one of the two lines should be skipped.

In above skipping methods, any one of the two lines may be skipped, but considering that a reference line closer to the current block is usually more suitable as a reference line, a reference line farther away from the current block is skipped in this embodiment.

In TIMD, due to that technologies of MRL, TIMD, and MPM may be used simultaneously, under TIMD, sometimes a decided intra prediction mode is TIMD fusion mode, while the joint action of MRL and Planar mode usually does not bring additional performance improvement. Therefore, when MRL is selected, if an intra prediction mode is Planar mode or there is a Planar mode under the TIMD fusion mode, sorting may not be performed. In addition to the Planar mode, sorting may not be performed under some specific angles or modes, for example, sorting is not performed under a DC mode, not performed under a wide angular mode, not performed under a horizontal and vertical angular modes, etc. The wide angular mode may be equivalent to that sorting is not performed in a rectangular prediction block.

When sorting is not performed, an initial set reference line list is shown as {1, 3, 5, 7, 12}, and resorting is not performed on these reference lines in the list based on SAD.

In this embodiment, some transform modes may be skipped. The current MRL is encoded at a relatively back position among all intra prediction modes, in ECM, it is necessary to determine whether a current mode is MRL only after it is determined that the current mode is not DIMD, BDPCM, MIP, or TIMD. Considering that encoding for the subsequent transform mode requires more flag bits to identify the primary transform and the quadratic transform, in order to reduce the encoding overhead in this regard, MRL may also be limited to be used only in combination with a portion of transform modes, for example, MRL may only be used with the primary transform of DCT2 or only with the primary transform of DCT2 and the quadratic transform. For example, when it is limited that MRL may only be used together with the primary transform of DCT2, whether MRL has been selected should be checked for decoding syntax elements of a transform mode, and if MRL is selected, the primary transform mode is not decoded.

The corresponding syntax is as follows:

| | Descriptor |
|---|---|
| coding_unit( x0, y0, cbWidth, cbHeight, cqtDepth, treeType, modeType ) { | |
|  ... ... | |
|  if( Min( lfnstWidth, lfnstHeight ) >= 4 && | |
|  sps_lfnst_enabled_flag = = 1 && | |
|  CuPredMode[ chType ][ x0 ][ y0 ] = = | |
|  MODE_INTRA && lfnstNotTsFlag = = 1 && | |
|  ( treeType = = DUAL_TREE_CHROMA \|\| | |
|  !IntraMipFlag[ x0 ][ y0 ] \|\| Min( lfnstWidth, | |
|  lfnstHeight ) >= 16 ) && Max( cbWidth, | |
|  cbHeight ) <= MaxTbSizeY) { | |
|   if( ( IntraSubPartitionsSplitType != | |
|   ISP_NO_SPLIT \|\| LfnstDcOnly = = 0 ) && | |
|   LfnstZeroOutSigCoeffFlag = = 1 ) | |
|    lfnst_idx | ae(v) |
|  } | |
|  if( treeType != DUAL_TREE_CHROMA && | |
|  lfnst_idx = = 0 && intra_luma_ref_tab_idx != 0 && | |
|  transform_skip_flag[ x0 ][ y0 ][ 0 ] = = 0 && | |
|  Max( cbWidth, cbHeight ) <= 32 && | |
|  IntraSubPartitionsSplitType = = ISP_NO_SPLIT && | |
|  cu_sbt_flag = = 0 && MtsZeroOutSigCoeffFlag = = | |
|  1 && MtsDcOnly = = 0 ) { | |
|   if( ( ( CuPredMode[ chType ][ x0 ][ y0 ] = = | |
|   MODE_INTER && | |
|   sps_explicit_mts_inter_enabled_flag ) \|\| | |
|   ( CuPredMode[ chType ][ x0 ][ y0 ] = = | |
|   MODE_INTRA && | |
|   sps_explicit_mts_intra_enabled_flag ) ) ) | |
|    mts_idx | ae(v) |
|   } | |
|  } | |
| } | |

In a column filled with a field of "intra_luma_ref_tab_idx!=0 &&" in the above table, some conditions are defined to determine whether to decode a field of mts_idx (an index of a transform mode selected for the primary transform), which includes that a multiple reference line index is not 0.

In another example, when it is limited that MRL is not used together with the quadratic transform under the primary transform, whether MRL has been selected should be checked for decoding syntax elements of a transform mode, and if MRL is selected, the quadratic transform mode is not decoded. The corresponding syntax is as follows:

| | Descriptor |
|---|---|
| coding_unit( x0, y0, cbWidth, cbHeight, cqtDepth, treeType, modeType ) { | |
|  ... ... | |
|  if( Min( lfnstWidth, lfnstHeight ) >= 4 && | |
|  sps_lfnst_enabled_flag = = 1 && | |
|  CuPredMode[ chType ][ x0 ][ y0 ] = = | |
|  MODE_INTRA && lfnstNotTsFlag = = 1 && | |
|  intra_luma_ref_tab_idx != 0 && ( treeType = = | |
|  DUAL_TREE_CHROMA \|\| | |
|  !IntraMipFlag[ x0 ][ y0 ] \|\| Min( lfnstWidth, | |
|  lfnstHeight ) >= 16 ) && Max( cbWidth, | |
|  cbHeight ) <= MaxTbSizeY) { | |
|   if( ( IntraSubPartitionsSplitType != | |
|   ISP_NO_SPLIT \|\| LfnstDcOnly = = 0 ) && | |
|   LfnstZeroOutSigCoeffFlag = = 1 ) | |
|    lfnst_idx | ae(v) |
|  } | |
|  if( treeType != DUAL_TREE_CHROMA && | |
|  lfnst_idx = = 0 && | |
|  transform_skip_flag[ x0 ][ y0 ][ 0 ] = = 0 && | |
|  Max( cbWidth, cbHeight ) <= 32 && | |
|  IntraSubPartitionsSplitType = = ISP_NO_SPLIT && | |

-continued

| | Descriptor |
|---|---|
|  cu_sbt_flag = = 0 && MtsZeroOutSigCoeffFlag = = | |
|  1 && MtsDcOnly = = 0 ) { | |
|   if( ( ( CuPredMode[ chType ][ x0 ][ y0 ] = = | |
|   MODE_INTER && | |
|   sps_explicit_mts_inter_enabled_flag ) \|\| | |
|   ( CuPredMode[ chType ][ x0 ][ y0 ] = = | |
|   MODE_INTRA && | |
|   sps_explicit_mts_intra_enabled_flag ) ) ) | |
|    mts_idx | ae(v) |
|   } | |
|  } | |
| } | |

In a column filled with a field of "intra_luma_ref_tab_idx!=0 &&" in the above table, some conditions are defined to determine whether to decode a field of lfnst_idx (an index of a transform mode selected for the quadratic transform), which includes that a multiple reference line index is not 0.

A Third Step

A reference line is determined according to a resorted multiple reference line index list and a decoded list index, and prediction is performed on the current block.

In this embodiment, when the multiple reference line index list is sorted for intra prediction, differences between predicted values and a reconstructed value of the template region is sorted in an ascending order, to obtain a sorted multiple reference line index list based on the current block, so that a reference line that is more likely to be selected for prediction is placed at a front position in the multiple reference line index list, thus saving encoding overhead. In a sorting process of this embodiment, some possible repeated reference lines to be sorted are skipped by setting a threshold, which can reduce redundancy and improve sorting efficiency. In this embodiment, the reference line where the template region is located and the reference line smaller than the reference line cannot be involved in sorting, and original positions of these reference lines in the candidate list may be maintained.

Based on this embodiment, reference lines that may be involved in sorting may be added. In this embodiment, although 12 extended reference lines may be used to involve in sorting at most, in fact, without considering the complexity, this limitation may be removed so that more than 12 reference lines may be used for sorting, to obtain better encoding performance.

In addition, a size of the template region may be increased. The template region is not limited to a reference line closest to the current block, but may continue to be extended, for example, extended to a right side of an above side of the template region, a region below a left side of the template region, or extended to a gray portion intersecting at an above left corner. The template region may further be extended continuously to an above side of an above side of the template region or to a left side of a left side of the template region, so that more regions of reference lines may be used. For example, when a region of reference line 1 is further used as the template region, reference line 1 itself cannot involve in sorting.

On the ECM-4.0 reference software, using the method according to this embodiment to resort the MRL index list of the current block in a case where TIMD is not used for the current block may further bring the following performance improvements on the reference software.

| | | All Intra Main 10 Over ECM | | |
| | Y | U | V | EncT | DecT |
|---|---|---|---|---|---|
| Class A1 | 0.00% | 0.14% | 0.03% | 104% | 100% |
| Class A2 | #VALUE! | #VALUE! | #VALUE! | #DIV/0! | #DIV/0! |
| Class B | −0.05% | 0.04% | −0.08% | 106% | 103% |
| Class C | −0.08% | −0.05% | −0.02% | 106% | 100% |
| Class E | −0.04% | 0.07% | −0.01% | 108% | 99% |
| Overall | #VALUE! | #VALUE! | #VALUE! | #DIV/0! | #DIV/0! |
| Class D | −0.04% | 0.13% | −0.13% | 106% | 96% |
| Class F | 0.01% | 0.01% | 0.04% | 105% | 103% |

Using the above-mentioned method according to this embodiment to sort the MRL index list of the current block in both cases where TIMD is not used for the current block and where TIMD is used for the current block may further bring the following performance improvements on the reference software.

| | | All Intra Main 10 Over ECM | | |
| | Y | U | V | EncT | DecT |
|---|---|---|---|---|---|
| Class A1 | 0.01% | 0.13% | −0.07% | 108% | 106% |
| Class A2 | #VALUE! | #VALUE! | #VALUE! | #DIV/0! | #DIV/0! |
| Class B | −0.07% | −0.09% | −0.13% | 110% | 108% |
| Class C | −0.09% | −0.10% | −0.07% | 110% | 109% |
| Class E | −0.02% | 0.14% | 0.00% | 111% | 104% |
| Overall | #VALUE! | #VALUE! | #VALUE! | #DIV/0! | #DIV/0! |
| Class D | −0.06% | −0.03% | −0.07% | 109% | 103% |
| Class F | −0.10% | −0.04% | 0.08% | 104% | 105% |

In the above tests, reference lines 1 to 12 are also used to involve in sorting in a case where TIMD is used for the current block. Only two reference lines line_a, line_b with minimum SADs are maintained to fill in the sorted MRL index list: {0, line_a, line_b}.

The parameters in the table are as follows.

EncT: Encoding Time, 10X % represents that after technologies for sorting the reference lines are integrated, an encoding time is 10X % compared with that of a situation of before integration, which means that the encoding time increases by X %.

DecT: Decoding Time, 10X % represents that after technologies for sorting the reference lines are integrated, an decoding time is 10X % compared with that of a situation of before integration, which means that the decoding time increases by X %.

ClassA1 and Class A2 are test video sequences with a resolution of 3840×2160, ClassB is a test sequence with a resolution of 1920×1080, a resolution of ClassC is 832×480, a resolution of ClassD is 416×240, and a resolution of ClassE is 1280×720; ClassF are screen content sequences with several different resolutions.

All intra indicates a test configuration of all intra frame configuration.

In a first clause, provided is a multi-reference line index list sorting method, and the method includes:

performing prediction on a template region according to at least portion of reference lines of a current block located outside the template region respectively, to calculate differences between a reconstructed value of the template region and predicted values obtained from prediction; and filling indexes of reference lines corresponding to the differences into a multiple reference line (MRL) index list of the current block according to an ascending order of the differences, to obtain a sorted MRL index list based on the current block.

In a second clause, the method of the first clause, where the performing prediction on the template region according to the at least portion of reference lines of the current block located outside the template region respectively includes:

performing, for each reference line in the at least portion of the reference lines, prediction on the template region by using a reconstructed value of the reference line and an intra prediction mode selected for the current block.

In a third clause, the method of the first clause, filling the indexes of the reference lines corresponding to the differences into the MRL index list of the current block is: filling the indexes of the reference lines corresponding to the differences position by position starting from a $K_1$-th position of the MRL index list until a $K_2$-th position is filled at most, where $25K_1 \leq K_2 \leq M$, and M is a length of the MRL index list.

In a fourth clause, the method of the third clause, the method further includes:

filling, from a 1st position to a $(K_1-1)$-th position that are not involved in sorting in the sorted MRL index list based on the current block, indexes of reference lines where the template region of the current block is located, where an index of a reference line filled in the 1st position is 0.

In a fifth clause, the method of the first clause, filling the indexes of the reference lines corresponding to the differences into the MRL index list of the current block is: filling the indexes of the reference lines corresponding to the differences position by position starting from a 1st position of the MRL index list until a $K_2$-th position is filled at most, where $1 \leq K_2 \leq M$, and M is a length of the MRL index list.

In a sixth clause, the method of the third or fifth clause, the method further includes:

in a case where $K_2 < M$, filling, starting from a $(K_2+1)$-th position to an M-th position of the MRL index list, indexes of $(M-K_2)$ reference lines position by position in an ascending order of distances from the current block to a reference line, where the $(M-K_2)$ reference lines are located outside the template region, and specified by a system, and indexes of the $(M-K_2)$ reference lines are different from indexes that have been filled in the MRL index list.

In a seventh clause, the method of the first clause, where the at least portion of the reference lines of the current block located outside the template region include:

N' reference lines closest to the current block and outside the template region; or odd-numbered lines among the N' reference lines closest to the current block and outside the template region; or even-numbered lines among the N' reference lines closest to the current block and outside the template region; or N reference lines selected by comparing differences between neighbor lines from the N' reference lines closest to the current block and outside the template region, $N \leq N'$; or N reference lines specified from the N' reference lines closest to the current block and outside the template region;

where $N' \leq N_{max}$, $N_{max}$ is a maximum number of reference lines that are allowed to involve in sorting.

In an eighth clause, the method of seventh clause, the N' reference lines closest to the current block and outside the template region are reference lines that do not exceed an upper boundary of a coding tree unit (CTU) where the current block is located;

a $N_{max}$ set in a case where a template-based intra mode derivation (TIMD) is used for the current block and a $N_{max}$ set in a case where TIMD is not used for the current block are both greater than or equal to 3.

In a ninth clause, the method of seventh clause, a manner adopted for selecting the N reference lines by comparing the differences between neighbor reference lines is:

designating a reference line outside the template region and closest to the current block as a first selected reference line, comparing the first selected reference line with neighbor reference lines of the first selected reference line one by one, and designating a neighbor reference line closest to the first selected reference line and whose difference between the neighbor reference line and the first selected reference line is greater than a set threshold as a newly selected reference line, and so on until the N' reference lines have been compared and selected;

where the difference refers to a difference between reconstructed values of two reference lines, or refers to a difference between predicted values obtained by respectively performing prediction on the template region with reference to the reconstructed values of the two reference lines.

In a tenth clause, the method of the first or ninth clause, a difference is represented as a sum of absolute differences (SAD), or represented as a sum of absolute transformed differences (SATD).

In an eleventh clause, the method of the first clause, the template region of the current block is set on a reference line closest to the current block; or the template region of the current block is set on a plurality of reference lines closest to the current block.

In a twelfth clause, provided is a video decoding method, and the method includes:

decoding intra prediction related syntax elements of a current block in a bitstream, and continuing to decode a multiple reference line index of the current block in a case where multiple reference line (MRL) is allowed to be used for the current block, where the multiple reference line index is used to indicate a position of an index of a reference line selected for the current block in an MRL index list;

in a case where it is determined that an MRL index list of the current block is allowed to be sorted according to a decoding result, sorting the MRL index list of the current block according to the method of any one of the first to eleventh clauses, to obtain a sorted MRL index list based on the current block; and determining the reference line selected for the current block according to the multiple reference line index and the sorted MRL index list based on the current block, and performing intra prediction on the current block according to the reference line selected for the current block.

In a thirteenth clause, the method of the twelfth clause, method further includes:

in a case where it is determined that the MRL index list of the current block is not allowed to be sorted according to the decoding result, determining the reference line selected for the current block according to the multiple reference line index and a set MRL index list, and performing intra prediction on the current block according to the reference line selected for the current block.

In a fourteenth clause, the method of the twelfth clause, a sufficient condition for allowing the MRL index list of the current block to be sorted includes: a flag of the current block indicating that the MRL index list is allowed to be sorted being true.

In a fifteenth clause, the method of the thirteenth clause, where any one or more of following conditions is designated as a sufficient condition for not allowing the MRL index list of the current block to be sorted:

multiple reference line (MRL) being not used for the current block;

the multiple reference line index indicating a position in the MRL index list that does not involve in sorting;

the current frame being not a luma frame;

the current block being located at an upper boundary of a coding tree unit (CTU);

an intra prediction mode selected for the current block being a specified mode, where the specified mode includes any one or more of following modes: a planar mode, a TIMD fusion mode with a mode of planar mode, an average mode, a horizontal angular mode, a vertical angular mode, and a wide angular mode;

a size of the current block not meeting a set condition;

an aspect ratio of the current block not meeting a set condition; or one of template-based intra mode derivation (TIMD) being used for the current block or TIMD being not used for the current block.

In a sixteenth clause, the method of the twelfth clause, where a case where MRL is used for the current block, the method further includes:

decoding syntax elements of a portion of transform modes that is capable of being used with the MRL simultaneously for the current block, and skipping syntax elements of a portion of transform modes that is not capable of being used with the MRL simultaneously; and/or in a process of decoding an intra prediction mode selected for the current block, allowing to decode syntax elements related to a second most probable mode (MPM).

In a seventeenth clause, the method of the twelfth clause, where decoding the intra prediction related syntax elements of the current block in the bitstream includes:

decoding an intra prediction mode selected for the current block for sorting the MRL index list of the current block;

where performing intra prediction on the current block according to the reference line selected for the current block includes:

performing intra prediction on the current block according to the reference line selected for the current block and the intra prediction mode selected for the current block.

In a eighteenth clause, the method of the seventeenth clause, where decoding the multiple reference line index of the current block includes:

decoding the multiple reference line index of the current block according to different MRL index lists in a case where TIMD is used for the current block and in a case where TIMD is not used for the current block.

In a nineteenth clause, the method of the thirteenth clause, in a case where it is determined that TIMD is not used for the current block, the set MRL index list is {0, 1, 3, 5, 7, 12};

in a case where it is determined that TIMD is used for the current block, the set MRL index list is {0, 1, 3} or {0, 1, 2}.

In a twentieth clause, provided is a video encoding method, and the method includes:

performing intra prediction on a current block, to determine a reference line selected for the current block;

in a case where it is determined that an MRL index list of the current block is allowed to be sorted, sorting the MRL index list of the current block according to the method of any one of the first to eleventh clauses, to obtain a sorted MRL index list based on the current block; and determining and encoding a multiple reference line index of the current block according to a position of an index of the reference line selected for the current block in the sorted MRL index list based on the current block.

In a twenty-first clause, the method of the twentieth clause, the method further includes:

in a case where it is determined that the MRL index list of the current block is not allowed to be sorted, determining and encoding the multiple reference line index of the current block according to the position of the index of the reference line selected for the current block in a set MRL index list.

In a twenty-second clause, the method of the twentieth clause, the method further includes:

in a case where it is determined that the MRL index list of the current block is allowed to be sorted, setting a flag of the current block indicating that the MRL index list is allowed to be sorted as true.

In a twenty-third clause, the method of the twenty-first clause, where any one or more of following conditions is designated as a sufficient condition for not allowing the MRL index list of the current block to be sorted:

multiple reference line (MRL) being not used for the current block;

the reference line selected for the current block being located in a template region of the current block;

the current frame being not a luma frame;

the current block being located at an upper boundary of a coding tree unit (CTU);

an intra prediction mode selected for the current block being a specified mode, where the specified mode includes any one or more of following modes: a planar mode, a TIMD fusion mode with a mode of planar mode, an average mode, a horizontal angular mode, a vertical angular mode, and a wide angular mode;

a size of the current block not meeting a set condition;

an aspect ratio of the current block not meeting a set condition;

one of TIMD being used for the current block or TIMD being not used for the current block; or in a case where all conditions for not allowing the MRL index list of the current block to be sorted are not met, determining that the MRL index list of the current block is allowed to be sorted.

In a twenty-fourth clause, the method of the twentieth clause, the method further includes:

determining and encoding the multiple reference line index of the current block includes:

in a case where TIMD is used for the current block, determining and encoding the multiple reference line index of the current block according to a position of the index of the reference line selected for the current block in a first MRL index list; or in a case where TIMD is not used for the current block, determining and encoding the multiple reference line index of the current block according to a position of the index of the reference line selected for the current block in a second MRL index list; where a length of the second MRL index list is greater than or equal to a length of the first MRL index list.

In a twenty-fifth clause, the method of the twentieth clause, where in a case where MRL is used for the current block, the method further includes:

encoding syntax elements of a portion of transform modes that is capable of being used with the MRL simultaneously for the current block, and skipping encoding for a portion of transform modes that is not capable of being used with the MRL simultaneously.

In a twenty-sixth clause, the method of the twentieth clause, where in a case where MRL is used for the current block and a mode selected for the current block is not a TIMD mode, the method further includes:

after encoding the multiple reference line index, continuing to encode an intra prediction mode selected for the current block, and in a process of encoding the intra prediction mode selected for the current block, allowing to encode syntax elements related to a second MPM.

In a twenty-seventh clause, the method of the twentieth clause, where before sorting the MRL index list of the current block according to the method of any one of the first to eleventh clauses, the method further includes:

determining an intra prediction mode selected for the current block.

In a twenty-eighth clause, provided is a bitstream, where the bitstream includes a multiple reference line (MRL) index of a current block, and the multiple reference line index is used to indicate a position of an index of a reference line selected for the current block in an MRL index list, and the MRL index list is a sorted MRL index list based on the current block, or a set MRL index list.

In a twenty-ninth clause, the bitstream of the twenty-eighth clause, the bitstream is generated according to the video encoding method of any one of the twentieth to twenty-seventh clauses.

In a thirtieth clause, provided is a multi-reference line index list sorting device, which includes: a processor, and a memory storing a computer program, where the processor is configured to implement, upon executing the computer program, the multi-reference line index list sorting method of any one of the first to eleventh clauses.

In a thirty-first clause, provided is a video decoding device, which includes: a processor, and a memory storing a computer program, where the processor is configured to implement, upon executing the computer program, the video decoding method of any one of the twelfth to nineteenth clauses.

In a thirty-second clause, provided is a video encoding device, which includes: a processor, and a memory storing a computer program, where the processor is configured to implement, upon executing the computer program, the video encoding method of any one of the twentieth to twenty-seventh clauses.

In a thirty-third clause, provided is a video encoding and decoding system, which includes: the video encoding device of the thirty-second clause and the video decoding device of the thirty-first clause.

In a thirty-fourth clause, provided is a non-transitory computer-readable storage medium, where the computer-readable storage medium stores a computer program, where the computer program, when executed by a processor, implements the multi-reference line index list sorting method of any one of the first to eleventh clauses, or the video decoding method of any one of the twelfth to nineteenth clauses, or the video encoding method of any one of the twentieth to twenty-seventh clauses.

In one or more of the above exemplary embodiments, the described functions may be implemented in hardware, software, firmware, or any combination thereof. If these functions are implemented in software, the functions may be stored on a computer-readable medium or transmitted by the computer-readable medium as one or more instructions or codes, which are executed by a hardware-based processing unit. The computer-readable medium may include a computer-readable storage medium corresponding to a tangible medium such as a data storage medium, or may include a communication medium including any medium that facilitates the transfer of a computer program from one place to another, for example, transfer according to a communication protocol. In this manner, the computer-readable medium may generally correspond to a non-transitory tangible computer-readable storage medium or a communication medium such as a signal or a carrier. The data storage medium may be any available medium that may be accessed by one or more computers or one or more processors to retrieve instructions, codes and/or data structures for implementation of the technologies described in the present disclosure. A computer program product may include a computer-readable medium.

By way of example but not limitation, such computer-readable storage media may include RAM, ROM, EEPROM, CD-ROM or other optical storage devices, magnetic storage devices or other magnetic storage devices, a flash memory, or any other media that may be used to store desired program codes in the form of instructions or data structures and that may be accessed by a computer. Moreover, any connection may also be referred to as a computer-readable medium. For example, if a coaxial cable, a fiber optic cable, a twisted pair cable, a digital subscriber line (DSL), or a wireless technology such as infrared, radio, or microwave is used to transmit instructions from a website, a server, or other remote sources, then the coaxial cable, the fiber optic cable, the twisted pair cable, the DSL, or the wireless technology such as infrared, radio, or microwave are included in the definition of medium. However, it should be understood that computer-readable storage media and data storage media do not include connections, carriers, signals, or other transient (transitory) media, but are instead directed to non-transitory tangible storage media. As used herein, a disk and a light disk include a compact disc (CD), a laser disc, an optical disc, a digital versatile disc (DVD), a floppy disk, or a Blu-ray disc, etc., where the disk usually reproduces data magnetically, while the light disk reproduces data optically with lasers. Combinations of the above description should also be included within the scope of the computer-readable media.

Instructions may be executed, by one or more processors, such as one or more digital signal processors (DSPs), general purpose microprocessors, application specific integrated circuits (ASICs), field programmable logic arrays (FPGAs), or other equivalent integrated or discrete logic circuits. Accordingly, the term "processor" as used herein may refer to any of the foregoing structures or any other structures suitable for implementation of the technologies described herein. In addition, in some aspects, the functionality described herein may be provided within dedicated hardware and/or software modules configured for coding and decoding, or incorporated in a combined codec. Also, the described technologies could be fully implemented in one or more circuits or logic elements.

The technical solutions of the embodiments of the present disclosure may be implemented in a wide variety of devices or apparatuses, including a wireless mobile phone, an integrated circuit (IC), or a group of ICs (e.g., a group of chips). Various components, modules, or units are described in the embodiments of the present disclosure to emphasize functional aspects of devices configured to perform the described technologies, but do not necessarily require realization by different hardware units. Rather, as described above, the various units may be combined in a codec hardware unit or provided by a combination of interoperating hardware units (including one or more processors as described above) in conjunction with appropriate software and/or firmware.

What is claimed is:

1. A video decoding method, comprising:
decoding intra prediction related syntax elements of a current block in a bitstream, and continuing to decode a multiple reference line index of the current block in a case where multiple reference line (MRL) is allowed to be used for the current block, wherein the multiple reference line index is used to indicate a position of an index of a reference line selected for the current block in an MRL index list;
in a case where it is determined that an MRL index list of the current block is allowed to be sorted according to a decoding result, sorting the MRL index list of the current block, to obtain a sorted MRL index list based on the current block; and
determining the reference line selected for the current block according to the multiple reference line index and the sorted MRL index list based on the current block, and performing intra prediction on the current block according to the reference line selected for the current block;
wherein sorting the MRL index list of the current block, to obtain the sorted MRL index list based on the current block comprises:
performing prediction on a template region according to at least portion of reference lines of the current block located outside the template region respectively, to calculate differences between a reconstructed value of the template region and predicted values obtained from prediction; and
filling indexes of reference lines corresponding to the differences into the MRL index list of the current block according to an ascending order of the differences, to obtain the sorted MRL index list based on the current block.

2. The method of claim 1, wherein performing prediction on the template region according to the at least portion of reference lines of the current block located outside the template region respectively comprises:
performing, for each reference line in the at least portion of the reference lines, prediction on the template region by using a reconstructed value of the reference line and an intra prediction mode selected for the current block.

3. The method of claim 1, wherein the at least portion of the reference lines of the current block located outside the template region comprise:
N' reference lines closest to the current block and outside the template region; or
odd-numbered lines among the N' reference lines closest to the current block and outside the template region; or even-numbered lines among the N' reference lines closest to the current block and outside the template region; or N reference lines selected by comparing differences between neighbor lines from the N' reference lines closest to the current block and outside the template region, N≤N'; or N reference lines specified from the N' reference lines closest to the current block and outside the template region;

wherein N'≤$N_{max}$, $N_{max}$ is a maximum number of reference lines that are allowed to involve in sorting.

4. The method of claim 3, wherein the N' reference lines closest to the current block and outside the template region are reference lines that do not exceed an upper boundary of a coding tree unit (CTU) where the current block is located.

5. The method of claim 1, wherein the differences are represented as a sum of absolute differences (SAD), or represented as a sum of absolute transformed differences (SATD).

6. The method of claim 1, wherein the template region of the current block is set on a reference line closest to the current block; or the template region of the current block is set on a plurality of reference lines closest to the current block.

7. The method of claim 1, further comprising:

in a case where it is determined that the MRL index list of the current block is not allowed to be sorted according to the decoding result, determining the reference line selected for the current block according to the multiple reference line index and a set MRL index list, and performing intra prediction on the current block according to the reference line selected for the current block.

8. The method of claim 1, wherein a sufficient condition for allowing the MRL index list of the current block to be sorted comprises: a flag of the current block indicating that the MRL index list is allowed to be sorted being true.

9. The method of claim 7, wherein any one or more of following conditions is designated as a sufficient condition for not allowing the MRL index list of the current block to be sorted:

MRL being not used for the current block;

the multiple reference line index indicating a position in the MRL index list that does not involve in sorting;

the current frame being not a luma frame;

the current block being located at an upper boundary of a CTU;

an intra prediction mode selected for the current block being a specified mode, wherein the specified mode comprises any one or more of following modes: a planar mode, a template-based intra mode derivation (TIMD) fusion mode with a mode of planar mode, an average mode, a horizontal angular mode, a vertical angular mode, and a wide angular mode;

a size of the current block not meeting a set condition;

an aspect ratio of the current block not meeting a set condition; or one of TIMD being used for the current block or TIMD being not used for the current block.

10. A video encoding method, comprising:

performing intra prediction on a current block, to determine a reference line selected for the current block;

in a case where it is determined that an MRL index list of the current block is allowed to be sorted, sorting the MRL index list of the current block, to obtain a sorted MRL index list based on the current block; and determining and encoding a multiple reference line index of the current block according to a position of an index of the reference line selected for the current block in the sorted MRL index list based on the current block;

wherein sorting the MRL index list of the current block, to obtain the sorted MRL index list based on the current block comprises:

performing prediction on a template region according to at least portion of reference lines of the current block located outside the template region respectively, to calculate differences between a reconstructed value of the template region and predicted values obtained from prediction; and filling indexes of reference lines corresponding to the differences into the MRL index list of the current block according to an ascending order of the differences, to obtain the sorted MRL index list based on the current block.

11. The method of claim 10, further comprising:

in a case where it is determined that the MRL index list of the current block is not allowed to be sorted, determining and encoding the multiple reference line index of the current block according to the position of the index of the reference line selected for the current block in a set MRL index list.

12. The method of claim 10, further comprising:

in a case where it is determined that the MRL index list of the current block is allowed to be sorted, setting a flag of the current block indicating that the MRL index list is allowed to be sorted as true.

13. The method of claim 11, wherein any one or more of following conditions is designated as a sufficient condition for not allowing the MRL index list of the current block to be sorted:

multiple reference line (MRL) being not used for the current block;

the reference line selected for the current block being located in a template region of the current block;

the current frame being not a luma frame;

the current block being located at an upper boundary of a coding tree unit (CTU);

an intra prediction mode selected for the current block being a specified mode, wherein the specified mode comprises any one or more of following modes: a planar mode, a TIMD fusion mode with a mode of planar mode, an average mode, a horizontal angular mode, a vertical angular mode, and a wide angular mode;

a size of the current block not meeting a set condition;

an aspect ratio of the current block not meeting a set condition;

one of TIMD being used for the current block or TIMD being not used for the current block; or in a case where all conditions for not allowing the MRL index list of the current block to be sorted are not met, determining that the MRL index list of the current block is allowed to be sorted.

14. The method of claim 10, further comprising:

determining and encoding the multiple reference line index of the current block comprises:

in a case where TIMD is used for the current block, determining and encoding the multiple reference line index of the current block according to a position of the index of the reference line selected for the current block in a first MRL index list; or in a case where TIMD is not used for the current block, determining and encoding the multiple reference line index of the current block according to a position of the index of the reference line selected for the current block in a second MRL index list; wherein a length of the second MRL index list is greater than or equal to a length of the first MRL index list.

15. The method of claim 10, wherein in a case where MRL is used for the current block, the method further comprises:

encoding syntax elements of a portion of transform modes that is capable of being used with the MRL simultaneously for the current block, and skipping encoding for a portion of transform modes that is not capable of being used with the MRL simultaneously.

16. The method of claim 10, wherein in a case where MRL is used for the current block and a mode selected for the current block is not a TIMD mode, the method further comprises:

after encoding the multiple reference line index, continuing to encode an intra prediction mode selected for the current block, and in a process of encoding the intra prediction mode selected for the current block, allowing to encode syntax elements related to a second MPM.

17. The method of claim 10, wherein before sorting the MRL index list of the current block, the method further comprises:

determining an intra prediction mode selected for the current block.

18. A non-transitory computer-readable storage medium, having a computer program and a bitstream stored thereon, wherein the computer program, when executed by a processor, causes the processor to perform the following steps to generate the bitstream:

performing intra prediction on a current block, to determine a reference line selected for the current block;

in a case where it is determined that an MRL index list of the current block is allowed to be sorted, sorting the MRL index list of the current block, to obtain a sorted MRL index list based on the current block; and determining and encoding a multiple reference line index of the current block according to a position of an index of the reference line selected for the current block in the sorted MRL index list based on the current block;

wherein sorting the MRL index list of the current block, to obtain the sorted MRL index list based on the current block comprises:

performing prediction on a template region according to at least portion of reference lines of the current block located outside the template region respectively, to calculate differences between a reconstructed value of the template region and predicted values obtained from prediction; and filling indexes of reference lines corresponding to the differences into the MRL index list of the current block according to an ascending order of the differences, to obtain the sorted MRL index list based on the current block.

\* \* \* \* \*